(12) United States Patent
D'Evelyn et al.

(10) Patent No.: US 7,704,324 B2
(45) Date of Patent: Apr. 27, 2010

(54) APPARATUS FOR PROCESSING MATERIALS IN SUPERCRITICAL FLUIDS AND METHODS THEREOF

(75) Inventors: Mark Philip D'Evelyn, Niskayuna, NY (US); Robert Arthur Giddings, Slingerlands, NY (US); Fred Sharifi, Niskayuna, NY (US); Subhrajit Dey, Bangalore (IN); Huicong Hong, Niskayuna, NY (US); Joseph Alexander Kapp, Wynantskill, NY (US); Ashok Kumar Khare, Warren, PA (US)

(73) Assignee: General Electric Company, Niskayuna, NY (US)

( * ) Notice: Subject to any disclaimer, the term of this patent is extended or adjusted under 35 U.S.C. 154(b) by 659 days.

(21) Appl. No.: 11/042,858

(22) Filed: Jan. 25, 2005

(65) Prior Publication Data
US 2006/0177362 A1  Aug. 10, 2006

(51) Int. Cl.
*C30B 35/00* (2006.01)

(52) U.S. Cl. ............... 117/200; 117/206; 117/223; 422/64.1

(58) Field of Classification Search ........... 117/200, 117/206, 223; 422/64.1
See application file for complete search history.

(56) References Cited

U.S. PATENT DOCUMENTS

| | | | |
|---|---|---|---|
| 1,879,278 A | 9/1932 | Jacobs | |
| 1,986,196 A | 1/1935 | Grosse | |
| 2,544,414 A | 3/1951 | Bridgman et al. | |
| 2,745,713 A | 5/1956 | Suits | |
| 2,785,058 A | 3/1957 | Buehler | |
| 2,895,812 A | 7/1959 | Kohman | 117/72 |
| 2,941,241 A | 6/1960 | Strong | |
| 2,947,609 A | 8/1960 | Strong | |
| 2,947,610 A | 8/1960 | Hall et al. | |
| 3,013,867 A | 12/1961 | Sawyer | 117/72 |
| 3,030,662 A | 4/1962 | Strong | |
| 3,088,170 A | 5/1963 | Strong | |

(Continued)

FOREIGN PATENT DOCUMENTS

DE  4413423  10/1995

(Continued)

OTHER PUBLICATIONS

Zhong Weizhuo; "Synthetic Crystallization" (2 nd Edition); Editor in—charge: Li Yifa; Scientific Publication Press; Printed at China Science Academy Printing House; Second edition: Oct. 1994; ISBN 7-03-003952—I/O-689; (pp. 2).

(Continued)

*Primary Examiner*—Robert M Kunemund
*Assistant Examiner*—Matthew J Song
(74) *Attorney, Agent, or Firm*—McDonald Hokins LLC

(57) ABSTRACT

An apparatus and method for processing materials in supercritical fluids is disclosed. The apparatus includes a capsule configured to contain a supercritical fluid, a high strength enclosure disposed about the capsule and a sensor configured to sense pressure difference between an interior and an exterior of the capsule. The apparatus also includes a pressure control device configured to adjust pressure difference of the capsule in response to the pressure difference sensed by the sensor. The apparatus further includes at least one dividing structure disposed within the capsule that divides the capsule into a seed growing chamber and a nutrient chamber.

31 Claims, 12 Drawing Sheets

U.S. PATENT DOCUMENTS

| | | | |
|---|---|---|---|
| 3,101,259 A | 8/1963 | Sawyer | 117/69 |
| 3,107,395 A | 10/1963 | Bundy | |
| 3,313,004 A | 4/1967 | Vahldiek et al. | |
| 3,473,935 A | 10/1969 | Wilson et al. | |
| 3,567,643 A | 3/1971 | Flanigen et al. | |
| 3,607,014 A | 9/1971 | Huml et al. | |
| 3,650,823 A | 3/1972 | Mead et al. | 438/22 |
| 3,913,212 A | 10/1975 | Bachmann et al. | |
| 3,933,573 A | 1/1976 | Dugger | |
| 4,026,817 A * | 5/1977 | Ciuti et al. | 516/53 |
| 4,055,982 A | 11/1977 | Ter-Minassian et al. | |
| 4,170,320 A * | 10/1979 | Eagar | 222/146.6 |
| 4,202,930 A | 5/1980 | Kokta et al. | |
| 4,379,725 A * | 4/1983 | Kemp | 148/630 |
| 4,430,051 A | 2/1984 | von Platen | |
| 4,463,872 A * | 8/1984 | Yellowlees | 220/592 |
| 4,523,478 A | 6/1985 | Zacharias, Jr. | |
| 4,685,995 A | 8/1987 | Hirano | |
| 4,699,084 A | 10/1987 | Wilson et al. | |
| 4,762,823 A | 8/1988 | Watanabe et al. | |
| 4,783,320 A * | 11/1988 | Adamski et al. | 117/201 |
| 4,891,165 A | 1/1990 | Suthanthiran | |
| 4,910,403 A | 3/1990 | Kilham et al. | |
| 4,961,823 A | 10/1990 | Hirano et al. | |
| 5,169,486 A * | 12/1992 | Young et al. | 117/83 |
| 5,236,674 A | 8/1993 | Frushour | |
| 5,868,837 A | 2/1999 | DiSalvo et al. | |
| 5,902,396 A | 5/1999 | Purdy | |
| 5,911,824 A | 6/1999 | Hammond et al. | |
| 5,942,148 A | 8/1999 | Preston | |
| 5,993,545 A | 11/1999 | Lupton et al. | |
| 6,113,985 A | 9/2000 | Suscavage et al. | |
| 6,168,771 B1 * | 1/2001 | Saho et al. | 423/245.2 |
| 6,177,057 B1 | 1/2001 | Purdy | 423/409 |
| 6,270,569 B1 | 8/2001 | Shibata et al. | |
| 6,273,948 B1 | 8/2001 | Porowski et al. | |
| 6,285,010 B1 | 9/2001 | Fujikawa et al. | |
| 6,375,446 B1 | 4/2002 | Leonelli, Jr. | |
| 6,398,867 B1 * | 6/2002 | D'Evelyn et al. | 117/11 |
| 6,406,540 B1 | 6/2002 | Harris et al. | |
| 6,592,663 B1 | 7/2003 | Sarayama et al. | |
| 6,676,752 B1 | 1/2004 | Suscavage et al. | |
| 6,692,568 B2 | 2/2004 | Cuomo et al. | |
| 6,848,458 B1 | 2/2005 | Shrinivasan et al. | |
| 6,861,130 B2 | 3/2005 | D'Evelyn et al. | |
| 7,101,433 B2 | 9/2006 | D'Evelyn et al. | |
| 2002/0122757 A1 | 9/2002 | Chung et al. | |
| 2003/0041602 A1 | 3/2003 | Williams, III et al. | |
| 2003/0066800 A1 | 4/2003 | Saim et al. | |
| 2003/0127337 A1 | 7/2003 | Hanson et al. | 205/96 |
| 2003/0140845 A1 * | 7/2003 | D'Evelyn et al. | 117/8 |
| 2003/0141301 A1 * | 7/2003 | D'Evelyn et al. | 220/62.11 |
| 2003/0164138 A1 | 9/2003 | Sarayama et al. | |
| 2003/0183155 A1 | 10/2003 | D'Evelyn et al. | 117/68 |
| 2003/0209191 A1 | 11/2003 | Purdy | |
| 2004/0003495 A1 | 1/2004 | Xu | |
| 2004/0134415 A1 | 7/2004 | D'Evelyn et al. | |
| 2004/0173140 A1 * | 9/2004 | Liu et al. | 117/81 |
| 2005/0103257 A1 | 5/2005 | Xu et al. | |

FOREIGN PATENT DOCUMENTS

| | | |
|---|---|---|
| EP | 0 152 726 | 8/1985 |
| EP | 0 157 393 | 10/1985 |
| EP | 0 220 462 | 5/1987 |
| EP | 0 860 182 | 8/1998 |
| FR | 2 796 657 | 1/2001 |
| GB | 9 226 19 | 4/1963 |
| GB | 2 333 521 | 7/1999 |
| JP | 60091062 | 5/1985 |
| JP | 60122797 | 7/1985 |
| JP | 09206582 | 8/1997 |
| JP | 10005572 | 1/1998 |
| JP | 11060394 | 3/1999 |
| JP | 2001058900 | 3/2001 |
| JP | 2003176197 A | 6/2003 |
| JP | 2004066108 A | 3/2004 |
| WO | WO 98/55671 | 12/1998 |
| WO | WO 0124921 | 4/2001 |
| WO | WO 01/36080 | 5/2001 |
| WO | WO 02/34972 | 5/2002 |
| WO | WO 03064021 | 8/2003 |
| WO | WO 2004/053206 | 6/2004 |
| WO | WO 2004/053208 | 6/2004 |
| WO | WO 2004071649 | 8/2004 |
| WO | WO 2005/122232 | 12/2005 |

OTHER PUBLICATIONS

K. Byrappa and Masahiro Yoshimura, "*Apparatus*", Handbook of Hydrothermal Technology, pp. 82-160, 2001.

Dissertation: Cubic Boron Nitride: Stability of the Domain and new Ways of Elaboration, Translated from French by the Ralph McElroy Co., Custom Division, PO Box 4828, Austin, Texas 78765 USA.

H. Jacobs et al, "*High Pressure Ammonolysis in Solid-State Chemistry*", Materials Science, vol. 8, Chapter 5, pp. 383-427, 1982.

V. L. Solozhenko et al, "*On the Lowest Pressure of Sphaleritic Boron Nitride Spontaneous Crystallization*", J. Superhand Maker, vol. 14, No. 6, Letters to the Editor, Allerton Press, Inc., p. 64, 1992.

Mark A. Sneeringer et al, "*Milk Cartons and Ash Cans: Two Unconventional Welding Techniques*", American Mineralogist, vol. 70, pp. 200-201, 1985.

ES Itskevich, "*High-Pressure Cells for Studies of Properties of Solids (Review)*", Instruments and Experimental Techniques, vol. 42, No. 3, pp. 291-302, 1999.

Scott L. Boettcher, "A Simple Device for Loading Gases in High-Pressure Experiments", American Mineralogist, vol. 74, pp. 1383-1384, 1989.

Andrew D. Hanser et al, "Growth, Doping and Characterization of Epitaxial Thin Films and Patterned Structures of AlN, GaN, and $Al_xGa_{1-x}N$", Diamond and Related Materials, vol. 8, pp. 288-294, 1999.

K. Lawniczak-Jablonska et al., "Polarization Dependent X-Ray Absorption Studies of the Chemical Bonds Anisotropy in Wurtzite GaN Grown at Different Conditions", Journal of Alloys and Compounds, vol. 328, pp. 77-83, 2001.

M. Yano et al., "*Growth of Nitride Crystals, BN, AlN and GaN by Using a Na Flux*", Diamond and Related Materials, Elsevier Science Publishers, Amsterdam, NL, vol. 9, No. 3-6, pp. 512-515, Apr. 2000.

Masaichi Yano et al., "*Control of Nucleation Site and Growth Orientation of Bulk GaN Crystals*", Japanese Journal of Applied Physics, Publication Office Japanese Journal of Applied Physics, Tokyo, Japan, vol. 38, No. 10A, Part 2, pp. L1121-L1123, Oct. 1, 1999.

Joseph W. Kolis et al., "Materials Chemistry and Bulk Crystal Growth of Group III Nitrides in Supercritical Ammonia", Materials Research Society, vol. 495, pp. 367-372, 1998.

Masato Aoki et al., "Growth of 5 mm GaN Single Crystals at 750° C From An Na-Ga Melt", American Chemical Society, Crystal Growth & Design, vol. 1, No. 2, pp. 119-122, Feb. 3, 2001.

S. Porowski, "Near Defect Free GaN Substrates", High Pressure Research Center, Polish Academy of Sciences, Sokolowska 29/37, 01-142 Warsaw, Poland, sylvek@unipress.waw.pl, 11 pages, 1999.

S. Porowski et al., "Growth of GaN single Crystals Under High Nitrogen Pressure", High Pressure Research Center, Polish Academy of Sciences, ul. Sokolowska 29/37, 01-142, Warsaw, Poland, Chapter 9, pp. 295-313, 1997.

M. Bickermann et al, "Characterization of Bulk AlN With Low Oxygen Content", Journal of Crystal Growth, vol. 269, pp. 432-442, 2004.

\* cited by examiner

APPARATUS FOR PROCESSING MATERIALS IN SUPERCRITICAL FLUIDS AND METHODS THEREOF

BACKGROUND

The invention relates generally to techniques for processing materials in supercritical fluids. Specifically, embodiments of the invention include techniques for controlling parameters associated with a material processing capsule disposed within a high-pressure apparatus/enclosure.

Supercritical fluids may be used to process a wide variety of materials. A supercritical fluid is defined as a substance beyond its critical point, i.e., critical temperature and critical pressure. A critical point represents the highest temperature and pressure at which the substance can exist as a vapor and liquid in equilibrium. In certain supercritical fluid applications, the materials being processed are placed inside a pressure vessel or other high pressure apparatus. In some cases it is desirable to first place the materials inside a container, liner, or capsule, which in turn is placed inside the high pressure apparatus. In operation, the high pressure apparatus provides structural support for the high pressures applied to the container or capsule holding the materials. The container, liner, or capsule provides a closed/sealed environment that is chemically inert and impermeable to solvents and gases that may be generated by the process. In some applications, such as crystal growth, the pressure vessel or capsule also includes a baffle plate that separates the interior into different chambers, e.g., a top half and a bottom half. The baffle plate typically has a plurality of random or uniformly spaced holes to enable fluid flow and heat and mass transfer between these different chambers, which hold the different materials being processed along with a supercritical fluid. For example, in typical crystal growth applications, one half of the capsule contains seed crystals and the other half contains nutrient material. In addition to the materials being processed, the capsule contains a solid or liquid that forms the supercritical fluid at elevated temperatures and pressures and, typically, also a mineralizer to increase the solubility of the materials being processed in the supercritical fluid. In other applications, for example, synthesis of zeolites or of nano-particles or processing of ceramics, no baffle plate may be used for operation. In operation, the capsule is heated and pressurized toward or beyond the critical point, thereby causing the solid and/or liquid to transform into the supercritical fluid.

The processing limitations for conventional steel hot-wall pressure vessels (e.g., autoclaves) are typically limited to a maximum temperature of about 400 Degrees Celsius and a maximum pressure of 0.2 GigaPascals (GPa). Fabrication of pressure vessels from nickel-based superalloys allows for operation at a maximum temperature of about 550 degrees Celsius and a maximum pressure of about 0.5 GPa. Therefore, these hot-wall pressure vessels are inadequate for some processes, such as the growth of gallium nitride crystals in supercritical ammonia, which require pressures and temperatures that extend significantly above this range in order to achieve growth rates above about 2-3 microns per hour.

In addition, existing cold-wall pressure vessels, e.g., hot isostatic presses (HIPs), may not adequately account for pressure differences between the interior of the capsule and the high pressure apparatus surrounding the exterior of the capsule. For example, during the growth of crystals, the capsule inside the high pressure apparatus tends to deform due to the difference in pressure between an inner surface and an outer surface of the capsule. Moreover, existing baffle plates within the capsule or pressure vessel have random holes, which do not adequately distribute the heat and substances circulating within the capsule.

Accordingly, a technique is needed for processing materials with supercritical fluids at relatively higher temperatures and pressures than existing systems. A need also exists for monitoring and controlling the environment inside the capsule to facilitate a uniform growth of crystals. A further need exists for monitoring and controlling the differential pressures on the walls of the capsule to reduce deformations of the capsule. Also, an improved baffle plate is needed to provide a desired heat distribution and flow profile within the capsule to, thereby, provide a uniform growth of crystals.

BRIEF DESCRIPTION

In accordance with one embodiment of the present technique, an apparatus and method for growing crystals is disclosed. Certain embodiments of the apparatus have a capsule configured to contain a supercritical fluid and a pressure vessel is configured to contain a pressurized gas surrounding the capsule. The apparatus also includes a pressure control device configured to balance an interior pressure within the capsule with a surrounding pressure of the pressurized gas within the pressure vessel in response to sensed environmental conditions within the capsule or the pressure vessel.

In accordance with another embodiment of the present technique, a method of operation of an apparatus is disclosed. Certain embodiments of the apparatus include identifying a differential between an interior pressure within a supercritical fluid capsule and a surrounding pressure between a pressure vessel and the supercritical fluid capsule. The method further includes adjusting the interior pressure or the surrounding pressure to substantially balance the differential between the interior pressure and the surrounding pressure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
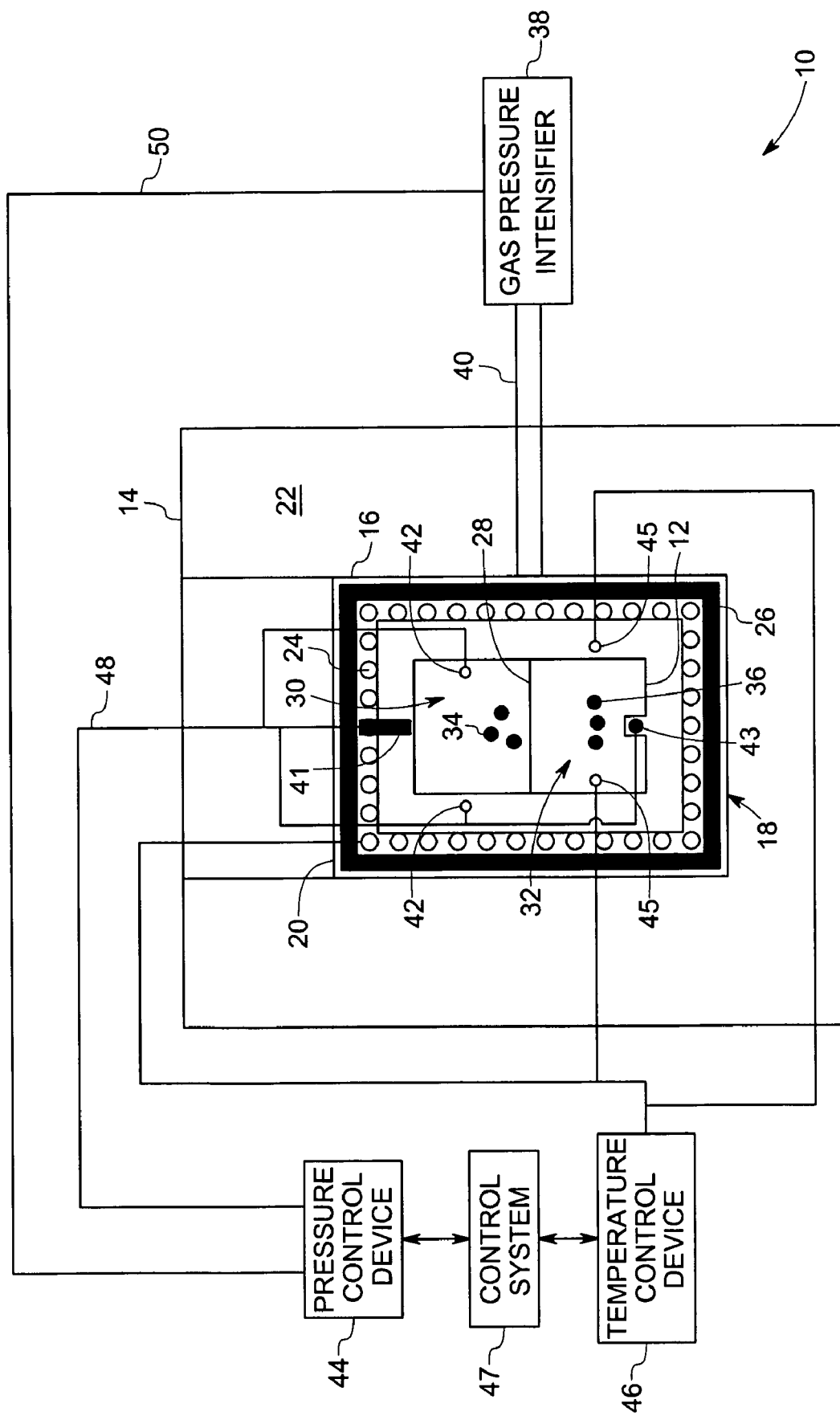
FIG. 1 illustrates a diagrammatical side view of a system having temperature and pressure controllers coupled to an apparatus having a capsule disposed in a pressure vessel in accordance with embodiments of the present technique.

Turning now to the drawings, FIG. 1 illustrates a diagrammatical side view of a system 10 having a container or capsule 12 disposed in an apparatus 14 in accordance with certain embodiments of the present technique. The capsule 12 is chemically inert and impermeable to one material, solvent, and the supercritical fluid formed by the solvent. The capsule 12 is formed from a deformable material to allow expansion of the capsule 12 as pressure increases within the capsule 12. This prevents the capsule 12 from bursting. In one embodiment, the deformable material may comprise at least one of copper, copper-based alloy, gold, silver, palladium, platinum, iridium, ruthenium, rhodium, osmium, titanium, vanadium, chromium, iron, iron- based alloy, nickel, nickel-based alloy, zirconium, niobium, molybdenum, tantalum, tungsten, rhenium, combinations thereof, and the like. In another embodiment, the capsule 12 is formed from a cold-weldable material, such as, but not limited to, at least one of copper, copper-based alloy, gold, silver, palladium, platinum, iridium, ruthenium, rhodium, osmium, iron, iron- based alloy, nickel, nickel-based alloy, molybdenum, and combinations thereof. Iron-base alloys that may be used to form capsule 12 include, but are not limited to, stainless steels. Nickel-base alloys that may be used to form capsule include, but are not limited to, inconel, hastelloy, and the like. In one embodiment, the capsule is closed, sealed, and substantially free of air prior to insertion in the high pressure apparatus. In the illustrated embodiment, the capsule does not contain a movable plunger, as it is difficult to maintain a chemically inert, air-tight seal. Instead, the capsule has a relatively fixed outer enclosure, such that the capsule changes geometry by expansion and contraction (e.g., deformation) during a particular supercritical fluid process. In one embodiment of the present technique, the capsule includes a closed end, at least one wall adjoining the closed end and extending therefrom and an airtight sealed end adjoining the at least one wall opposite the closed end. The sealed end is formed after introducing a material into at least one chamber, evacuating the chamber, and introducing a solvent into at least one chamber without substantial exposure to air. An additional outer seal may then be provided to the sealed end by cold welding, arc welding, or the like. Once sealed, the chamber within the capsule is substantially air-free, and the material contained therein can be processed with reduced risk of contamination.

As discussed in further detail below, the system 10 includes a variety of features to improve processing of substances at or above a supercritical point. For example, the system 10 is configured to control temperature and pressure in a more uniform manner, thereby substantially improving conditions for materials processing inside the capsule 12 and for reducing stress on the walls of the capsule 12. Moreover, the system 10 is configured to improve heat and flow distribution throughout different regions of the capsule 12, thereby further improving conditions for materials processing inside the capsule 12.

As illustrated in FIG. 1, the apparatus 14 comprises a high strength enclosure/high strength apparatus 16, such as a pressure vessel or outer pressure-bearing structure, positioned about the capsule 12, such that the high strength enclosure 16 provides a substantially closed/sealed environment 18 about the capsule 12. The capsule 12 has a closed end, adjoining a closed end and extending therefrom, and a sealed end opposite to the closed end. Closed end and sealed end define a closed chamber within the capsule 12 for containing at least one material and the solvent that becomes a supercritical fluid at a high pressure and high temperature.

Although the high strength enclosure 16 may have a variety of structures, the illustrated high strength enclosure 16 includes a cap or top portion 20 removably coupled to a cup-shaped retaining portion 22. The high strength enclosure 16 is constructed from a high strength material, such as SA723 or another high strength steel, to support high pressures (e.g., 15,000 pounds per square inch (psi), to about 150,000 psi) within the closed/sealed environment 18. The apparatus 14 further comprises a plurality of heating elements 24 disposed around the perimeter of the capsule 12, such that the temperature of the capsule 12 can be raised or lowered in a uniform manner. In certain embodiments, the plurality of heating elements 24 include at least one resistively heated tube, foil, ribbon, bar, wire, or combinations thereof. The illustrated embodiment also includes thermal insulation 26 positioned about the plurality of heating elements 24 inside the high strength enclosure 16, such that heat generated by the heating elements 24 is retained (i.e., less heat loss) within the closed/sealed environment 18 and the capsule 12. This thermal insulation 26 also functions to reduce heat transfer from the heating elements 24 to the surrounding high strength enclosure 16, thereby ensuring that the operating temperature of the high strength enclosure 16 is within a desired operating range. The apparatus 14 may optionally comprise a cooling system, for example, a recirculating system comprising water, a water/anti-freeze solution, oil, or the like. This cooling system helps to maintain the high strength enclosure 16 at a temperature where its strength and creep resistance remain high. Cooling may alternatively be provided by passive or forced air convection over the outer surface of the high strength enclosure.

Inside the temperature and pressure regulated environment of the high strength enclosure 16 of FIG. 1, the capsule 12 contains substances, such as a material and a solvent, at least one of which becomes supercritical at high temperatures and high pressures within the capsule 12. In certain cases, embodiments of the disclosed apparatus and methods may be useful for growing crystals or processing material in a fluid that is superheated, that is, at a temperature higher than its boiling point at atmospheric pressure, but not necessarily supercritical. It should be understood that the term "supercritical" may used interchangeably with the term "superheated" for purposes of defining the range of use of embodiments of the present invention. The capsule 12 may be used to process a variety of materials, including high quality gallium nitride single crystals or quartz crystals. In certain embodiments, the capsule 12 includes at least one dividing structure 28 such as a baffle plate, which divides the capsule 12 into multiple separate chambers, such as a first chamber 30 (e.g. a nutrient chamber) and a second chamber 32 (e.g. a seed/crystal growing chamber). The nutrient chamber contains the at least one material for processing the at least one material at supercritical temperature. The seed/crystal growing chamber or second chamber 32 may be located in the top or the bottom region of the capsule 12 depending on the particular supercritical fluid process, e.g., crystal and growth chemistry, and whether the solubility of the material being processed increases or decreases with temperature. The configuration shown in FIG. 1 is suitable for the case where the solubility of the material being re-crystallized is a decreasing function of the temperature. For the case where the solubility is an increasing function of the temperature, the nutrient chamber may be placed below the seed/crystal growing chamber. Although not illustrated in FIG. 1, the baffle plate 28 has a plurality of passageways to facilitate fluid flow, heat transfer, and mass transfer between the multiple separate chambers, e.g., the first chamber 30 and the second chamber 32. Exemplary embodiments of the baffle plate 28 are described in further detail below with reference to FIGS. 10-15. Initially, one or more nutrient materials, such as crystals or polycrystalline particles or nutrient particles 34, are placed in the first chamber 30, and one or more seed materials, such as crystal seeds 36, are placed in the second chamber 32. In an exemplary crystal growth process, as the internal environment within the capsule 12 becomes supercritical, solute dissolved from the nutrient particles 34 circulates to the crystal seeds 36, thereby facilitating crystal growth on the seeds 36 within the second chamber 32. The baffle plate 28 is configured to confine or separate the nutrient and/or seed materials to a specific region of the capsule 12, while permitting a supercritical fluid along with dissolved solute to migrate throughout the capsule 12 by passing freely through the passageways in the baffle plate 28. The details of the operation of the process will be explained in further sections below.

Turning now to the control features of the system 10 of FIG. 1, the heat and pressure developing inside the capsule 12 are controlled to ensure a desired temperature distribution inside the capsule 12 and to ensure relatively uniform pressures between the inside of the capsule 12 and the exterior of the capsule 12 (i.e., in the closed/sealed environment 18). In certain embodiments, the capsule 12 is self-pressurizing by heat or chemical reactions, for example, via the equation of state of ammonia or water for crystal growth of gallium nitride or quartz, respectively. For example, the heating elements 24 function to raise the temperature inside the capsule 12, thereby causing the substances disposed within the capsule 12 to expand and, thus, raise the pressure within the capsule 12.

To counteract this internal pressure within the capsule 12, a gas pressure intensifier 38 pumps a high-pressure gas, such as argon or another inert gas, through tubing 40 into the high strength enclosure 16 to pressurize the closed/sealed environment 18 surrounding the capsule 12. In the illustrated embodiment, the apparatus 14 of FIG. 1 also comprises one or more sensors, such as pressure or displacement sensors 41, 42, and 43, which are configured to sense a pressure difference between an interior and an exterior of the capsule 12. For example, the pressure sensors 42 and 43 may be used to sense external and internal pressures, which are then used to calculate the pressure difference. By further example, the displacement sensor 41 may be used alone to calculate deformation of the capsule 12, which deformation can be used to calculate the pressure difference. Another embodiment uses the pressure sensor 43 to sense an internal pressure, which is then compared with an external or surrounding pressure measured by the exterior pressure sensor 42. As illustrated, the pressure sensor 43 is disposed in a recess of the capsule 12, which is then sealed over the recess. Embodiments of this pressure sensor 43 include a thermal triplet. A thermal triplet comprises at least two thermocouple junctions; typically, with three or four wires. Each of the two junctions produces an electrical signal that is dependent on both the temperature difference and the pressure difference between the sample junction and a reference junction. To first approximation, the pressure coefficient of each junction is proportional to the difference in compressibility between the two metals comprising the junction. The two junctions are chosen to have different pressure coefficients, so that both the temperature and the pressure can be determined. For example, type K (chromel/alumel) thermocouples have a very small pressure coefficient, while type S (platinum/platinum-10% rhodium) thermocouples have a pressure coefficient that is larger in magnitude, and the magnitude of the pressure coefficient of platinum-10% rhodium/iron thermocouples is larger still.

The apparatus 10 also includes a pressure control device 44 configured to adjust the pressure difference (i.e., reduce, minimize, or eliminate) between the capsule 12 and the closed/sealed environment 18 in response to the pressure difference sensed by the one or more sensors 41, 42, and/or 43. Typically, the pressure ranges from about 1000 bars to about 10000 bars and the temperature ranges from about 300 degrees Celsius to about 1200 degrees Celsius. In other embodiments of the present technique, the pressure ranges to above 10000 bars and the temperature ranges to above 1500 degrees Celsius. The pressure control device 44 is configured to balance an interior pressure within the capsule 12 with an external or surrounding pressure of the pressurized gas within the pressure vessel in response to sensed environmental conditions within the capsule or the pressure vessel. As discussed above, these sensed environmental conditions may include an internal pressure, an exterior pressure, a deformation of the capsule 12, a temperature inside and/or outside of the capsule, and different combinations thereof.

In one embodiment of the illustrated technique, the sensor 41 comprises a displacement measuring device, such as a capacitance displacement transducer, configured to measure displacement or deformation of the capsule 12 due to the expansion or contraction of the capsule 12 due to the difference in pressure between the exterior and the interior of the capsule 12. In another embodiment, at least one of sensors 42 comprises a strain gauge and is configured to measure displacement or deformation of the capsule 12 due to the expansion or contraction of the capsule 12, which expansion or contraction is due to the difference in pressure between the exterior and the interior of the capsule 12. In response to a measured displacement of the capsule 12, the pressure control device 44 adjusts the internal pressure within the capsule 12 and/or the surrounding pressure in closed/sealed environment 18 via the gas pressure intensifier 38 to balance the internal and surrounding pressures, thereby substantially eliminating the pressure difference and preventing further displacement of the capsule 12. In another embodiment, at least one of pressure sensors 42 comprises a pressure-measuring device, such as a Bourdon gauge, which measures the surrounding pressure within the closed/sealed environment 18 surrounding the capsule 12. In operation, the pressure control device 44 compares this surrounding pressure against the internal pressure within the capsule 12, and then adjusts either the surrounding pressure via the gas pressure intensifier 38 or the internal pressure. However, a variety of sensors are within the scope of the present technique. The pressure control device 44 may comprise software, hardware, or suitable devices to monitor the pressure differences and to control the gas pressure intensifier 38 such that the surrounding pressure within the closed/sealed environment 18 is substantially equal to the pressure inside the capsule 12. In this manner, the capsule 12 can withstand relatively higher internal pressures, thereby facilitating processing of materials with supercritical fluids. In alternative embodiments, the pressure difference may be substantially eliminated or minimized by simultaneously controlling the temperature and pressure in tandem within the capsule 12.

Regarding the control of temperature in the system 10 of FIG. 1, the illustrated apparatus 14 also includes a plurality of temperature sensors 45 situated proximate to, and preferably in direct contact with, the capsule 12 for monitoring the temperature distribution of the capsule 12. In addition, these temperature sensors 45 may be positioned both inside and outside of the capsule 12 to facilitate control of the internal and external/surrounding conditions (e.g., temperature, pressure, etc.) of the capsule 12. The temperature sensors 45 may include a thermocouple, a thermistor, an optical fiber coupled to an optical pyrometer, or any combination thereof. These temperature sensors 45 are coupled to a temperature control device 46, which monitors and controls the temperature distribution of the capsule 12. In certain embodiments, the temperature control device 46 and the pressure control device 44 cooperate to provide a desired temperature and pressure within the capsule 12 (and optionally surrounding the capsule 12), while ensuring that the pressure differentials between the interior and exterior of the capsule 12 are substantially minimized. Moreover, the temperature sensors may be placed in a plurality of different zones, such as hot zones, around the exterior of the capsule 12, such that the temperature control device 46 can monitor and adjust temperature variations across these different zones. For example, the temperature control device 46 may independently control different elements or portions of the heating elements 24 in response to temperatures sensed in the different zones surrounding the capsule 12, thereby facilitating a balanced or desired temperature profile within the capsule 12. In one embodiment of the present technique, a central controller, computer, control circuitry, or control system 47 may couple the pressure control device 44 and the temperature control device 46, thereby simultaneously or centrally controlling the temperature and pressure associated with the capsule 12.

In operation of the system 10 of FIG. 1, the temperature control device 46 controls power to one or more of the heating elements 24 to provide a desired temperature profile within the capsule 12 over a desired time period. In other words, the temperature control device 46 may facilitate increasing, decreasing, and constant temperatures throughout different regions or zones within the capsule 12. Thus, the interior of the capsule 12 may have temperatures that are substantially constant or varying by time and position, i.e., X, Y, and Z directions.

For example, at high temperature conditions, the temperature is controlled such that a temperature gradient is established between the nutrient chamber or first chamber 30 and the seed/crystal growing chamber or second chamber 32. The temperature gradient between the two chambers 30 and 32 establishes a natural convection pattern of fluid flow. In the relatively cooler first chamber 30, the nutrient particles 34 partially dissolve to form a solution with a desired concentration of crystalline precursor. The relatively cooler, denser fluid from chamber 30 sinks through the openings of the baffle plate 28. In the second chamber 32, the hotter temperature leads to supersaturation of the solution of crystalline precursor, thereby causing the crystalline precursor to precipitate on the crystal seeds 36 located in the second chamber 32. The warmer, less dense fluid from the second chamber 32 rises into the first chamber 30 and the cycle continues. The temperature gradient between the second chamber 32 and the first chamber 30 significantly controls the growth rate of crystals 36. Accordingly, the temperature control device 46, heating elements 24, and baffle plate 28 significantly affect the growth of crystals in the capsule 12 by controlling the rate of fluid and heat transfer between the two chambers.

Under these processing conditions, the pressure in the interior of the capsule 12 reaches an elevated pressure when its temperature is raised to a predetermined value by directing electrical power to the heating elements 24. If the equation of state of the material in the capsule 12, that is, the pressure as a function of temperature and fill factor, is accurately known, the pressure in the high strength enclosure 16 may be ramped in tandem with the increase in temperature so that the gas pressure in the closed/sealed environment 18 is approximately equal to the pressure in the interior of the capsule 12. If this condition is not held, the capsule 12 will be crushed or will burst, depending on whether the exterior pressure exceeds the interior pressure or vice versa. Again, the pressure control device 44 ensures that the pressures inside and outside of the capsule 12 are substantially balanced during a particular process, thereby preventing undesirable deformations of the capsule 12 and facilitating much greater pressure ranges for the particular process.

For some types of supercritical fluid processing at high pressure and high temperature, a temperature gradient between two chambers of the capsule 12 is desired. For example, crystal growth is among those applications in which a temperature gradient is sometimes desirable. In certain applications of crystal growth, the vapor pressure of the solvent increases as the capsule 12 is heated. The vapor pressure of the solvent at a given temperature and quantity of solvent present within the capsule 12 can be determined from the phase diagram of the solvent. At a sufficiently high temperature and pressure, the solvent becomes a supercritical fluid. As explained above, as the internal pressure of the capsule 12 increases, the walls of the capsule 12 may deform outward.

In order to protect the capsule 12 from bursting due to over pressure, the pressure control device 44 functions to adjust the pressure in the closed/sealed environment 18. For example, the deformation of the capsule 12 can be measured by the sensor 41, which provides a signal 48 to the pressure control device 44. In some embodiments, the sensors 42 and 43 inside and outside of the capsule 12 measure the internal and external pressures, which are then used to identify the pressure difference between the inside and outside. In turn, the pressure control device 44 provides signals 50 to the gas pressure intensifier 38 to regulate the flow of gas to the capsule 12, thereby protecting the capsule 12 from bursting. In other words, if the interior pressure begins to exceed the exterior pressure causing the capsule 12 to deform outward, then one or more of the sensors 41, 42, and/or 43 indicates an internal-external pressure difference (or physical displacement/deformation) that triggers pressure adjustment by the pressure control device 44. For example, the one or more sensors 41, 42, and/or 43 may provide a signal 48 to the pressure control device 44, which device 44 causes the gas pressure intensifier 38 to increase the exterior gas pressure to minimize or eliminate the internal-external pressure difference. Conversely, if the exterior pressure begins to exceed the interior pressure, causing the capsule 12 to deform inward, then the one or more sensors 41, 42, and/or 43 transmit a signal 48 to the pressure control device 44, which reduces the exterior gas pressure to minimize or eliminate the internal-external pressure difference. For example, the system 10 may reduce the pumping of the gas pressure intensifier 38 or open a valve (not shown) to release some pressure.

Figure 2:
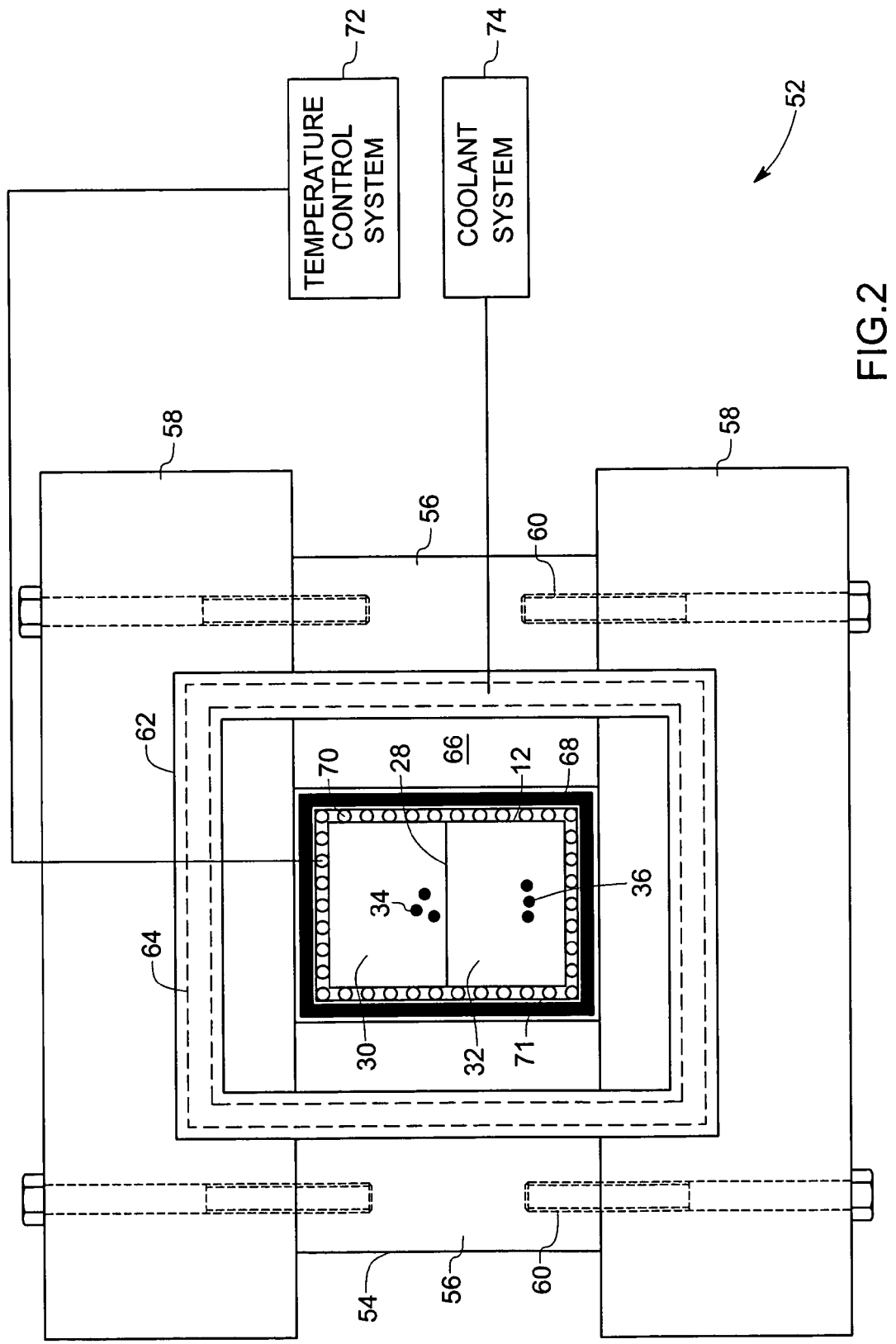
FIG. 2 illustrates a diagrammatical side view of a system having a temperature controller coupled to an apparatus having the capsule disposed in a high strength enclosure in accordance with another embodiment of the present technique.

Turning now to FIG. 2, this figure illustrates a diagrammatical side view of an apparatus having the capsule 12 disposed in a different high strength enclosure 52 in accordance with another embodiment of the present technique. It should be however noted that the high-strength enclosure might also be referred as a high-strength apparatus or a high strength enclosure. The illustrated high strength enclosure 52 includes a high strength outer casing 54 comprising a high strength sleeve 56 and high strength flanges 58 coupled to opposite ends of the casing 54 by bolts 60. High strength sleeve 56 and high strength flanges 58 may be constructed from SA723 or another high strength steel.

Inside the outer casing 54, the high strength enclosure 52 further includes a cooling sleeve 62 (e.g., 13-8 Mo precipitation hardened stainless steel) having one or more fluid flow passages 64 for circulating a desired coolant, such as water, oil, antifreeze solution, and so forth. In one embodiment of the present technique, the cooling sleeve 62 is omitted and cooling is provided by recirculation cooling of the outer surface of the high strength casing 54 or by passive or active convective air-cooling.

Inside the cooling sleeve 62, the high strength enclosure 52 further includes a high temperature liner 66, such as a nickel-based superalloy such as Rene 41 or Rene 88, or other suitable materials having high strength and capable of withstanding high temperatures. Thus, the high temperature liner 66 has sufficient high-temperature strength and creep resistance to support a load at high temperatures for desired time duration, for example, greater than 20,000 hours.

Inside the high temperature liner 66, the high-strength enclosure 52 includes thermal insulation 68 disposed about a plurality of heating elements 70, which are in turn embedded in a heater matrix 71 and disposed about the capsule 12. The heating elements 70 are embedded in the heater matrix 71, such that there is support for the heating elements 70 to prevent the capsule from filling the gaps between the heating elements 70. Thermal insulation 68 preferably has a relatively low thermal conductivity. Exemplary materials for the thermal insulation include zirconia, alkali halides, alkaline earth halides, metal halides, metal oxides, or metal carbonates, talc, olivine, and pyrophyllite. In one embodiment, thermal insulation 68 is not gas-tight, and no gas-tight seal between outer casing 54 and flanges 58 is provided. As a consequence, leaks in capsule 12 may be detected externally and the gas pressure in the space between capsule 12 and high strength enclosure 52 is less than 50%, and preferably less than 20%, of the pressure on the inside of capsule 12. Prevention of excessive expansion and rupture of the capsule is provided by contact with the heating device and the surrounding high-strength enclosure rather than by an external gas pressure. Heater matrix 71 preferably has a relatively high thermal conductivity and a low thermal expansion coefficient, and is fabricated to surround heater elements 70 with a minimum of dead volume. Exemplary materials for heater matrix 71 include inconel and stainless steel 410. It should be noted that though the present technique discloses a single cooling system for cooling both the high strength flanges 58 and the high temperature sleeves 56, separate cooling systems may also be implemented to cool the high strength flanges 58 and the high strength sleeves 56.

Collectively, the foregoing components of the high-strength enclosure 52 of FIG. 2 control heat and pressure to improve the processing-of materials within the capsule 12. For example, the heating elements 70 are coupled to a temperature control system 72, which responds to temperature feedback from one or more sensors (not shown) disposed about the capsule 12. Thus, the temperature control system 72 controls the temperature profile within the capsule 12 and, indirectly, the pressure within the capsule 12 based on the relationship between temperature and pressure. The thermal insulation 68 substantially reduces heat loss or transfer from the heating elements 70 outwardly into the surrounding structures of the high-strength enclosure 52.

Structural support is provided by the high temperature liner 66 and concentric outer casing 54, which have a generally closed-cylindrical geometry in the illustrated embodiment. These structural supports counteract the expansive nature of the capsule 12, which generates relatively high internal pressure during a particular process. In other words, if the capsule 12 begins to expand under pressure, then the capsule 12 engages the surrounding components and exerts its load on the high temperature liner 66 and outer casing 54. In the illustrated embodiment, these surrounding components are disposed concentrically about, in close proximity or contact with, the capsule 12. As a result, the pressures on the inside and outside of the capsule 12 are balanced by the surrounding components, particularly the liner 66 and casing 54. Accordingly, these surrounding components of the high-strength enclosure 52 substantially limit outward deformation of the capsule 12.

In addition, the fluid flow passages 64 of the cooling sleeve 62 disposed between these concentric high-strength structural supports, e.g., outer casing 54 and liner 66, increase the operable range of these structural supports by lowering their respective temperatures. In certain embodiments, these fluid flow passages 64 comprise helically arranged passages, ring-shaped passages, axial passages, winding passages, or zig-zagging passages disposed about the circumference of the cooling sleeve 62. In turn, these fluid flow passages 64 may be coupled to a coolant system 74, which circulates the desired coolant through the flow passages 64 and an external coolant system 74.

Figure 3:
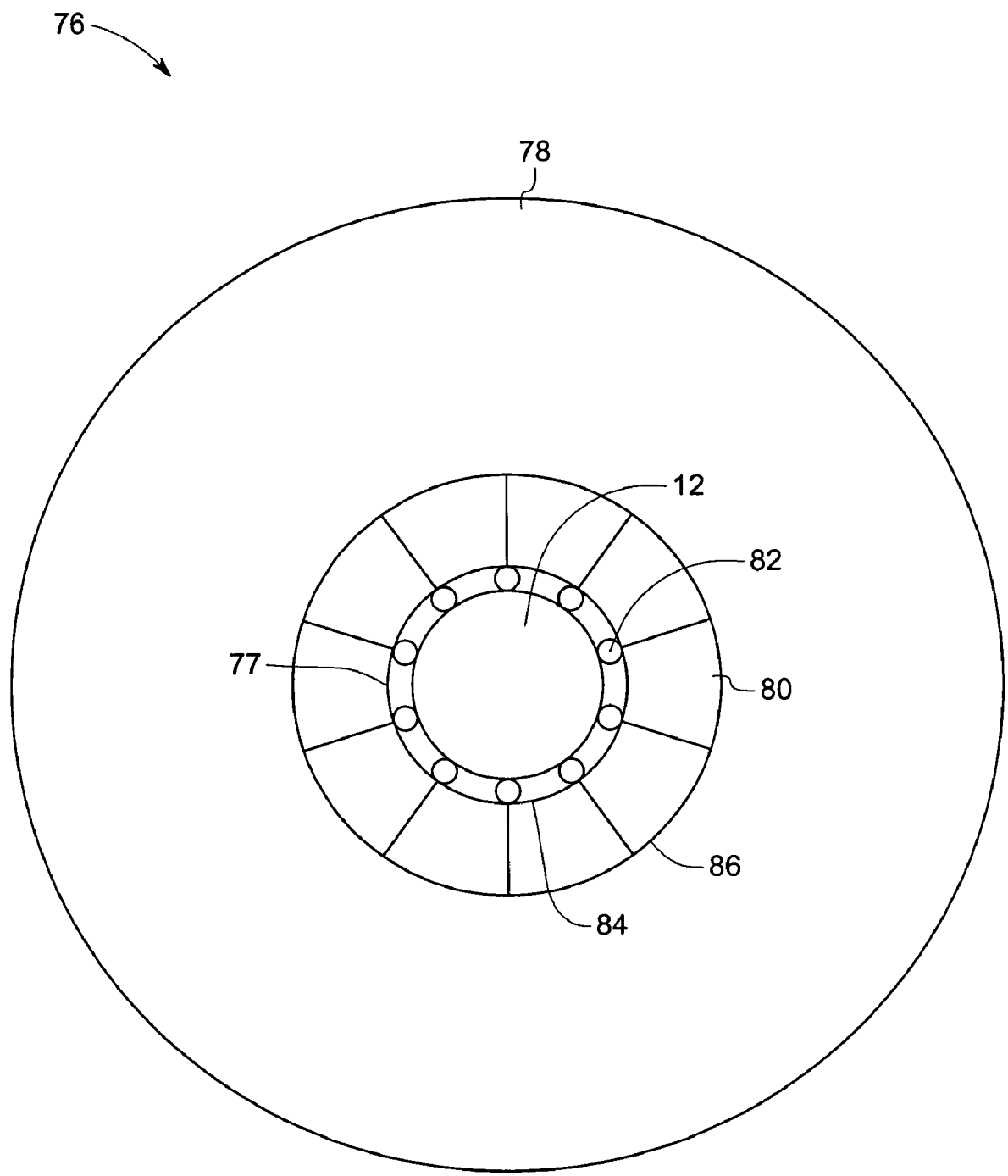
FIG. 3 illustrates a diagrammatical top view of an apparatus having the capsule disposed in another different high strength enclosure in accordance with a further embodiment of the present technique.

FIG. 3 illustrates a diagrammatical top view of an apparatus having the capsule disposed in another different high strength enclosure 76 in accordance with a further embodiment of the present technique. The illustrated embodiment includes a high strength outer casing 78 disposed about a plurality of high strength radial segments 80. In the illustrated embodiment, the high strength outer casing 78 has a closed-cylindrical shape, with at least one removable end cover or flange to permit installation and removal of the internal components. In turn, the high strength radial segments 80 comprise wedge-shaped structures, which are positioned side-by-side to form a cylindrical structure that is concentrically within the outer casing 78. Further inside the high strength enclosure 76, a plurality of heating elements 82 are disposed about the capsule 12, such that a temperature control system (not shown) can heat the capsule 12 and its contents. Furthermore, as described in FIG. 2, the plurality of heating elements 82 may be embedded in a heater matrix 77 in the space between the capsule 12 and the radial segments 80, such that there is support for the heating elements 82 to prevent the capsule from filling the gaps between the heating elements 82. In certain embodiments, the high strength enclosure 76 also may include thermal insulation, cooling passages, high temperature liners, and other features, such as those illustrated in FIGS. 1 and 2. In certain implementation of the present technique, the cooling passages may be disposed around the high strength outer casing. Furthermore, various features from the embodiments of FIGS. 1, 2, and 3 may be combined in other embodiments of the present technique.

In the illustrated embodiment of FIG. 3, the high strength outer casing 78 and the radial segments 80 cooperate to withstand and counteract the pressures building inside the capsule 12 during a particular process. For example, the radial segments 80 comprise a hard material that undergoes little or no deformation under operating conditions. The segments 80 may comprise a ceramic, such as alumina, silicon nitride, silicon carbide, zirconia, or the like. The segments 80 may alternatively comprise a refractory metal, such as tungsten, molybdenum, or TZM alloy, or a cermet, such as Co-cemented tungsten carbide. The material and wedge-shaped geometry of the radial segments 80 are configured to reduce the pressure transferred from the capsule 12 to the outer casing 78. In other words, the wedge-shaped radial segments 80 spread the load applied by the capsule 12 over the area on an inner diameter 84 of the segments 80 over a larger area 86 on the inner diameter of the outer casing 78, such that the outer casing 78 bears a relatively smaller pressure at an interface 86 between the radial segments 80 and the outer casing 78. For these reasons, the radial segments 80 cooperate with the outer casing 78 to counteract the pressures inside the capsule 12, thereby balancing the forces inside and outside of the capsule 12. As a result, the high pressure enclosure 76 of FIG. 3 is capable of withstanding relatively higher internal pressures and, thus, a wider range of supercritical fluid processing conditions.

In one embodiment, the capsule comprises an outer liner or sleeve. The sleeve preferably has a higher thermal expansion coefficient than the body of the capsule or the heater matrix. Therefore, when cooling down from the crystal growth or material processing temperature, the sleeve will compress the capsule by a greater extent than the heater matrix contracts, thereby opening up a gap between the outer diameter of the sleeve and the inner diameter of the heater matrix and facilitating removal of the capsule/sleeve assembly after the run.

The embodiments described above utilize a vertical configuration of the capsule and high strength enclosure. In other embodiments, the configuration is horizontal. For example, rather than having a first chamber 30 located above second chamber 32, they may be placed side by side. In order to facilitate convective fluid transport between first chamber 30 and second chamber 32 in this configuration, a mechanism may be provided to enable rocking of high strength enclosure 52, as is well known in the art.

Figure 4:
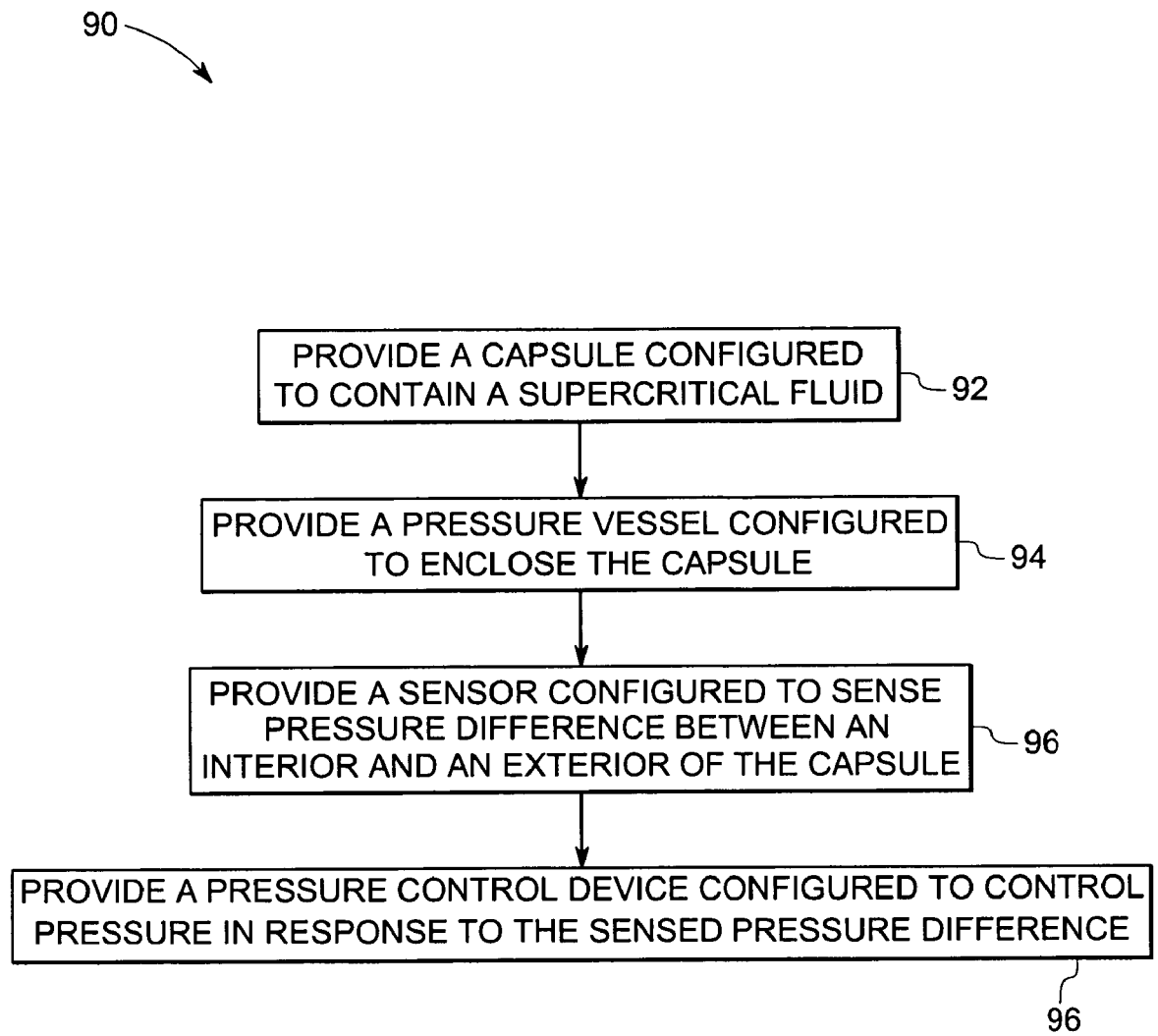
FIG. 4 is a flow chart illustrating an exemplary process of manufacturing the system of FIG. 1 in accordance with embodiments of the present technique.

FIG. 4 is a flow chart illustrating an exemplary process 90 of manufacturing the system of FIG. 1 in accordance with embodiments of the present technique. As illustrated, the process 90 comprises providing a capsule configured to contain a supercritical fluid (block 92). For example, the process 90 may provide a capsule having one or more features of the capsule 12 of FIGS. 1-3 and/or the baffle plates illustrated in FIGS. 10-13 as discussed in detail below. In certain embodiments, the process 90 may involve molding, machining, loading, welding, filling, or sealing, the capsule. The process 90 also includes providing a pressure vessel configured to enclose the capsule (block 94). For example, the process 90 may provide the pressure vessel having one or more of the features illustrated in FIGS. 1-3. The process 90 also may include placing the capsule inside the pressure vessel, such the pressure vessel is closed/sealed about the capsule. Additionally, the process 90 can include placing thermal insulation and heating elements inside the pressure vessel adjacent the capsule. The process 90 further comprises providing one or more sensors configured to sense pressure (or a pressure difference) associated with the interior and exterior of the capsule (block 96). For example, the one or more sensors may include capacitance displacement transducers or strain gauges, which are disposed proximate the capsule. In addition, the process 90 can include placing one or more temperature sensors proximate the capsule. The process 90 also includes providing a pressure control device configured to control pressure in response to the sensed pressure difference between the interior and exterior of the capsule (block 98). For example, the pressure control device may respond to the pressure difference by adjusting pressure on the interior and/or exterior of the capsule, thereby balancing the pressures to prevent undesirable deformations (expansion or contraction) of the capsule. In addition, the process 90 can include providing a temperature control system to adjust the temperature inside the pressure vessel and the capsule. Moreover, the process 90 may provide other features such as those described with reference to the accompanying figures.

Figure 5:
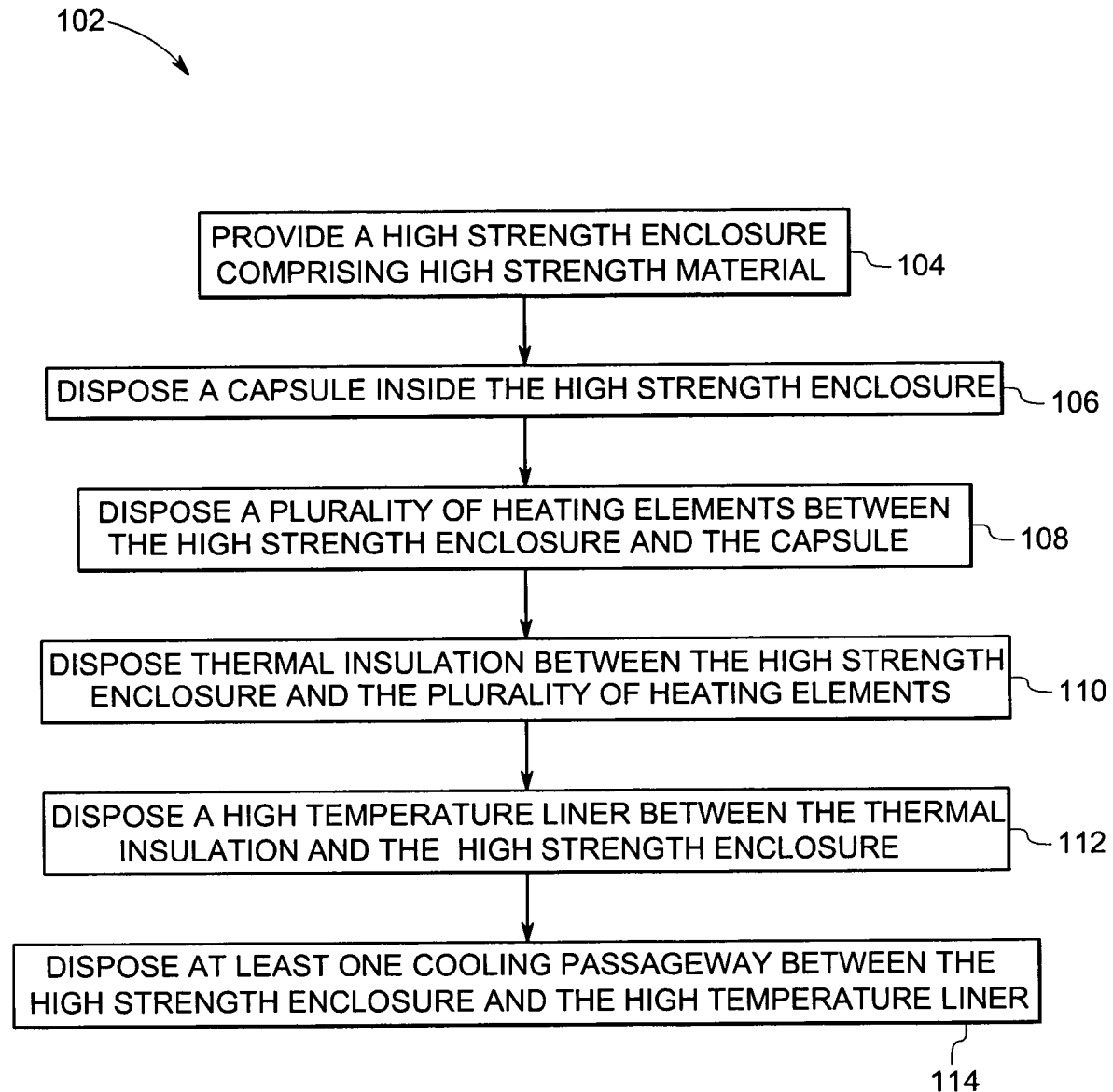
FIG. 5 is a flow chart illustrating an exemplary process of manufacturing the system of FIG. 2 in accordance with embodiments of the present technique.

FIG. 5 is a flow chart illustrating an exemplary process 102 of manufacturing the apparatus of FIG. 2 in accordance with embodiments of the present technique. The process 102 begins by providing a high strength enclosure having high strength material at block 104. At block 106, a capsule is disposed inside the high strength enclosure, wherein the capsule is configured to grow crystals. At block 108, the process 102 proceeds by disposing a plurality of heating elements between the high strength enclosure and the capsule. As explained above, the heating elements are disposed at various locations proximate the capsule for controlling the temperature of multiple zones of the capsule. Accordingly, the process 102 also may include coupling a temperature control system to the heating elements and corresponding temperature sensors, such that the desired temperature profile can be achieved inside the capsule. The process 102 also includes disposing thermal insulation between the high strength enclosure and the plurality of heating elements at block 110. At block 112, a high temperature liner is disposed between the thermal insulation and the wall of the high strength enclosure. Embodiments of this high temperature liner include a nickel-based superalloy, such as Rene 41 or Rene 88, or other suitable materials having high strength and capable of withstanding high temperatures. Finally, at block 114 the process 102 includes disposing at least one cooling passageway between the high strength enclosure and the high temperature liner. The cooling passageway is adapted for reducing the temperature of the high strength enclosure materials as compared to those generated inside the capsule. In addition, the process 102 may provide other features such as those described with reference to the accompanying figures.

Figure 6:
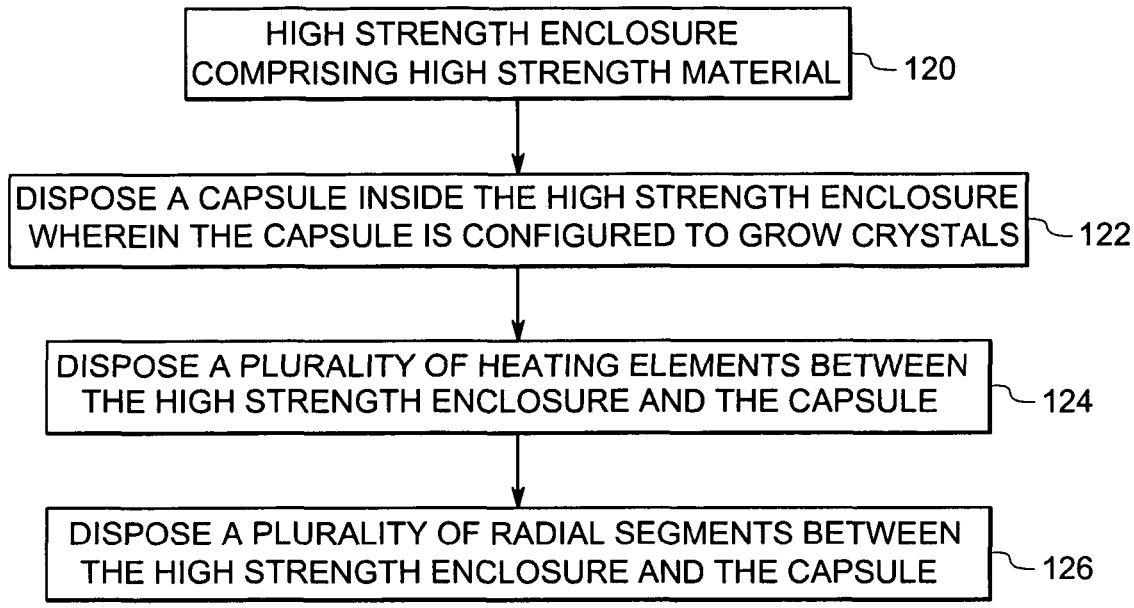
FIG. 6 is a flow chart illustrating an exemplary process of manufacturing the apparatus of FIG. 3 in accordance with embodiments of the present technique.

FIG. 6 is a flow chart illustrating an exemplary process 118 of manufacturing the apparatus of FIG. 3 in accordance with embodiments of the present technique. The process 118 begins by providing a high strength enclosure comprising high strength material (block 120). The process 118 also includes disposing a capsule inside the high strength enclosure, wherein the capsule is configured to contain a supercritical fluid (block 122). At block 124, the process proceeds by disposing a plurality of heating elements between the high strength enclosure and the capsule. The process 118 further includes disposing a plurality of radial segments between the high strength enclosure and the capsule (block 126). These radial segments are disposed one after another around a circumference of the capsule, such that each radial segment is a wedge-shaped portion of a segmented cylinder. The radial segment may comprise a ceramic, such as alumina, silicon nitride, silicon carbide, zirconia, or the like. The radial segment may alternatively comprise a refractory metal, such as tungsten, molybdenum, or TZM alloy, or a cermet, such as Co-cemented tungsten carbide. In addition, the process 118 may provide other features such as those described with reference to the accompanying figures.

Figure 7:
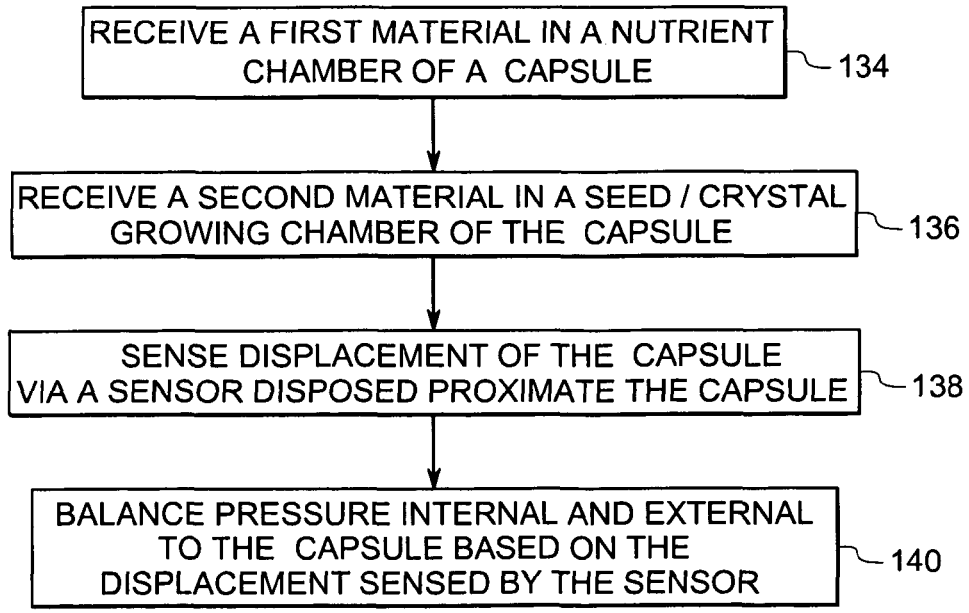
FIG. 7 is a flow chart illustrating an exemplary process of operating the system of FIG. 1 in accordance with embodiments of the present technique.

FIG. 7 is a flow chart illustrating an exemplary process 132 of operating the system of FIG. 1 in accordance with embodiments of the present technique. The process 132 begins by receiving a first material in a nutrient chamber of a crystal growth capsule (block 134), followed by receiving a second material in a seed/crystal growing chamber of the crystal growth capsule (block 136). As explained earlier, the capsule tends to expand as the temperature and pressure inside the capsule increases during a particular process. At block 138, the process 132 includes sensing displacement of the capsule via a sensor disposed proximate the crystal growth capsule. At block 140, the process 132 further includes substantially balancing pressure internal and external to the capsule based on the displacement measured by the sensor. In this manner, the process 132 enables the capsule to withstand higher internal pressures and, thus, processing in supercritical fluids under more extreme conditions.

Figure 8:
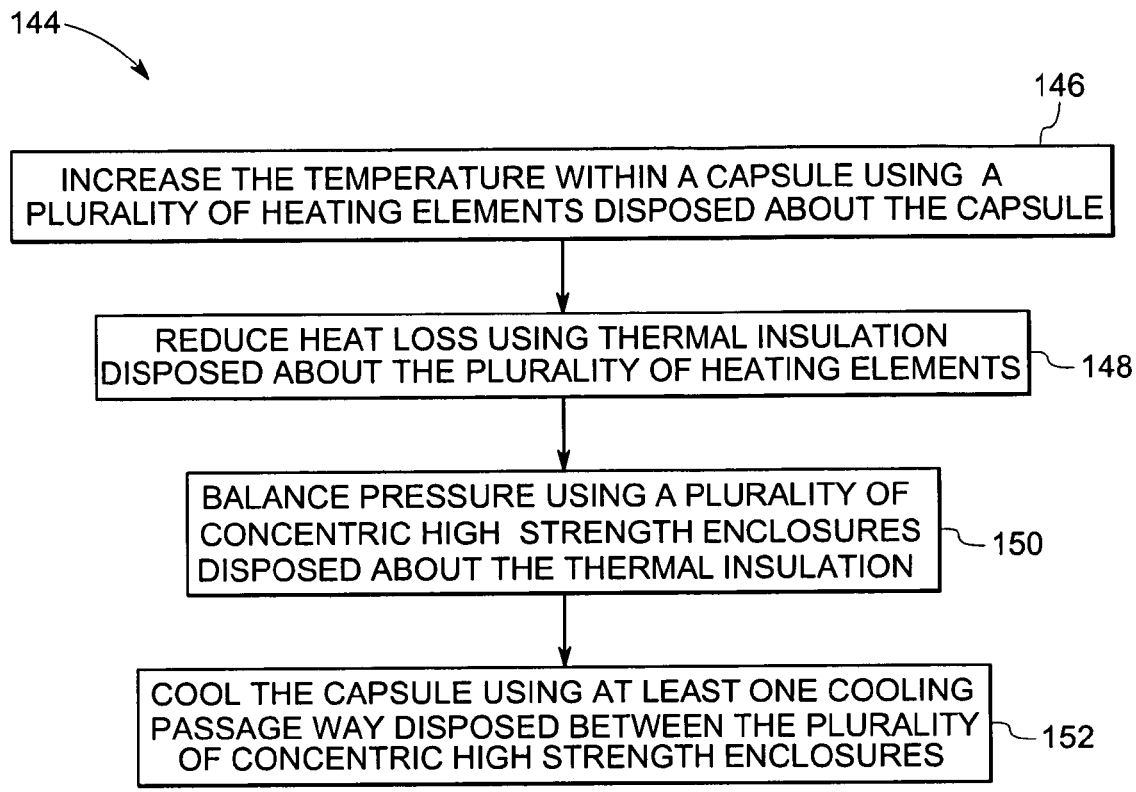
FIG. 8 is a flow chart illustrating an exemplary process of operating the system of FIG. 2 in accordance with embodiments of the present technique.

FIG. 8 is a flow chart illustrating an exemplary process 144 of operating the apparatus of FIG. 2 in accordance with embodiments of the present technique. The process 144 begins by increasing the temperature within a capsule using a plurality of heating elements disposed about the capsule (block 146). For example, the plurality of heating elements may be disposed about the perimeter of the capsule at various hot zones within the capsule. At block 148, the heat loss is reduced using thermal insulation disposed about the plurality of heating elements. At block 150, the process 144 includes substantially balancing pressure using a plurality of concentric high strength enclosures disposed about one another and the thermal insulation. As explained earlier, the capsule tends to expand as the temperature and pressure inside the capsule increases during a particular process. These concentric high strength enclosures are configured to cooperatively counterbalance the outward pressure of the capsule, thereby limiting expansion of the capsule and creating a pressure balance. In this manner, the concentric high strength enclosures increase the operating range of the capsule, such that processing can be performed with supercritical fluids. At block 152, the capsule is cooled using at least one cooling passageway disposed between the pluralities of concentric high strength enclosures. Again, this cooling improves the performance of the concentric high strength enclosures, such that processing can be performed at higher temperatures and pressures.

Figure 9:
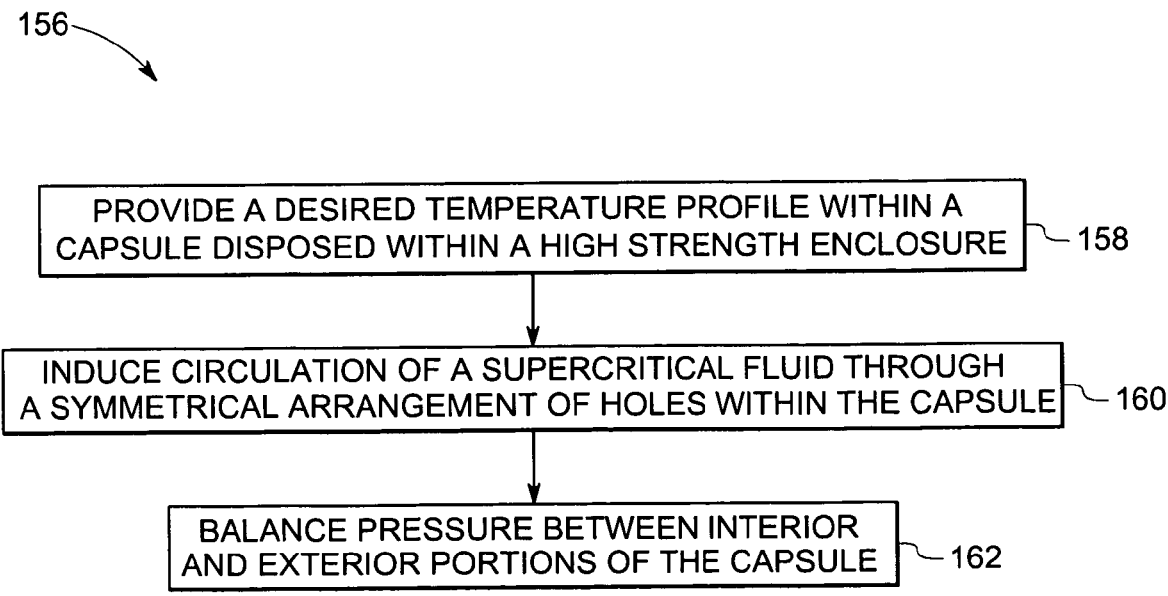
FIG. 9 is a flow chart illustrating an exemplary process of operating the systems and apparatus of FIGS. 1, 2, 3 and FIGS. 10-13 in accordance with embodiments of the present technique.

FIG. 9 is a flow chart illustrating an exemplary process 156 of operating the systems and apparatus of FIGS. 1, 2, and 3 and as will be explained in FIGS. 10-13 in accordance with embodiments of the present technique. The process 156 begins at block 158 by providing a desired temperature profile within a capsule disposed within a high strength enclosure/pressure vessel. At block 160, the process 156 further includes inducing circulation of a supercritical fluid through a symmetrical arrangement of holes within the capsule. For example, the symmetrical arrangement of holes may comprise a plurality of concentric annular holes, a plurality of holes of different shapes and sizes spaced symmetrically around an axis, and so forth. At block 162, the process 156 substantially balances pressure between interior and exterior portions of the capsule. For example, the process 156 may include a plurality of concentric high strength enclosures disposed about, and in close proximity with, the capsule, thereby counteracting expansive forces within the capsule. Also, the process 156 may include a pressure control device coupled to pressure sensors disposed proximate the capsule, such that process 156 can identify pressure differentials and adjust the pressure inside and/or outside of the capsule to attain a pressure balance. In addition, the process 156 may include a variety of other temperature and pressure control mechanisms, as described in detail above.

Figure 10:
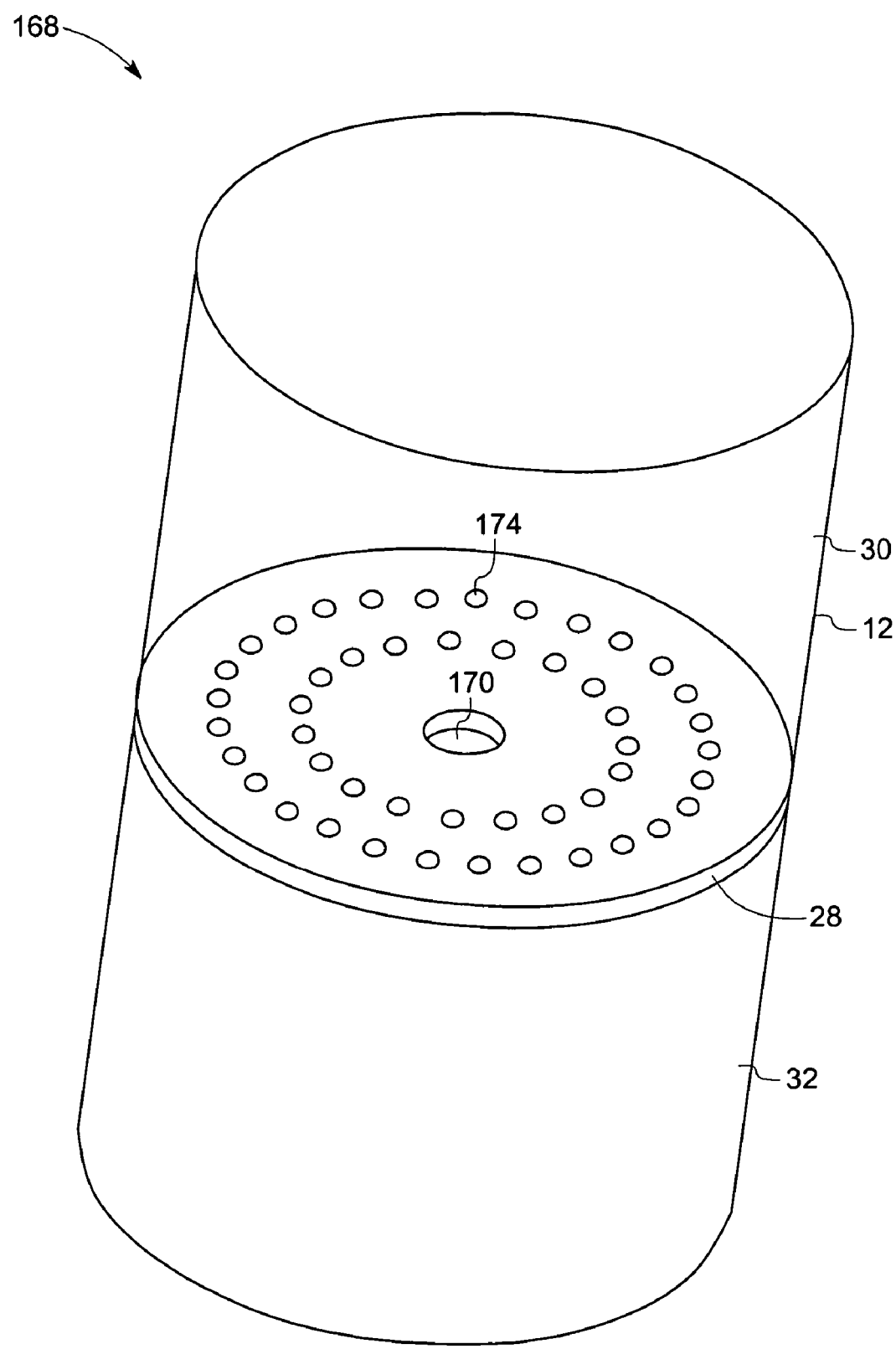
FIG. 10 illustrates an isometric view of a baffle plate disposed inside the capsule of FIGS. 1-3 in accordance with embodiments of the present technique.

FIG. 10 illustrates an isometric view of a system 168 having a baffle plate 28 disposed inside the capsule 12 of FIGS. 1-3 in accordance with embodiments of the present technique. The illustrated baffle plate 28 of FIG. 10 includes a central opening 170 and a plurality of openings 174 disposed symmetrically around the central opening 170. In the illustrated embodiment, the central opening 170 is substantially continuous and circular in cross-section. Similarly, each of the plurality of openings 174 has a circular cross-section having substantially the same diameter. However, alternative embodiments of the opening 170 and 174 may have a variety of sizes and shapes, such as rectangular, triangular, elliptical, or other suitable geometries. For example, as illustrated in FIG. 10, the central opening 170 has a relatively larger diameter than the surrounding plurality of openings 174. In alternative embodiments, the plurality of openings 174 may be replaced by a plurality of concentric ring-shaped openings, each having a different diameter or same diameter.

In operation, the symmetrical openings 170 and 174 of the baffle plate 28 of FIG. 10 substantially improve the heat distribution and circulation within the capsule 12, thereby improving materials processing (e.g., crystal growth) inside the capsule 12. As discussed above, the rate of crystal growth is a function of the degree of supersaturation in the second chamber 32 within the capsule 12. The degree of supersaturation is, in turn, guided by the difference in temperatures of the first chamber 30 and second chamber 32. The baffle plate 28 acts as a separator between these two chambers 30 and 32. In operation, the design of the baffle plate 28 affects the temperature difference between these two chambers 30 and 32, while also affecting mass transfer in the form of dissolved nutrients in the solvent. In certain embodiments of the present technique, the percentage open area and the distribution of the openings on the baffle plate 28 are selected to improve, and preferably optimize, the heat transfer distribution and flow circulation within the capsule 12.

In the second chamber 32, a temperature differential between different regions having crystal seeds tends to cause the more rapid growth of crystals at the hotter or cooler regions, depending on the growth chemistry. As a result, as the process approaches completion, crystals growing in some zones will be relatively undeveloped as compared to crystals growing in other zones within the second chamber 32. The baffle plate 28 minimizes these non-uniform conditions and results in more effective crystal growth. In other words, the symmetrically arranged openings 170 and 174 facilitate a more uniform temperature profile in the second chamber 32, thereby providing substantially uniform crystal growth. As a result, the crystals grow at a substantially equal rate regardless of their position in the second chamber 32 using these baffle plates 28. In addition, the degree of temperature differential between the first chamber 30 and the second chamber 32 can be controlled by controlling the percentage openings in the baffle plate 28.

Figure 11:
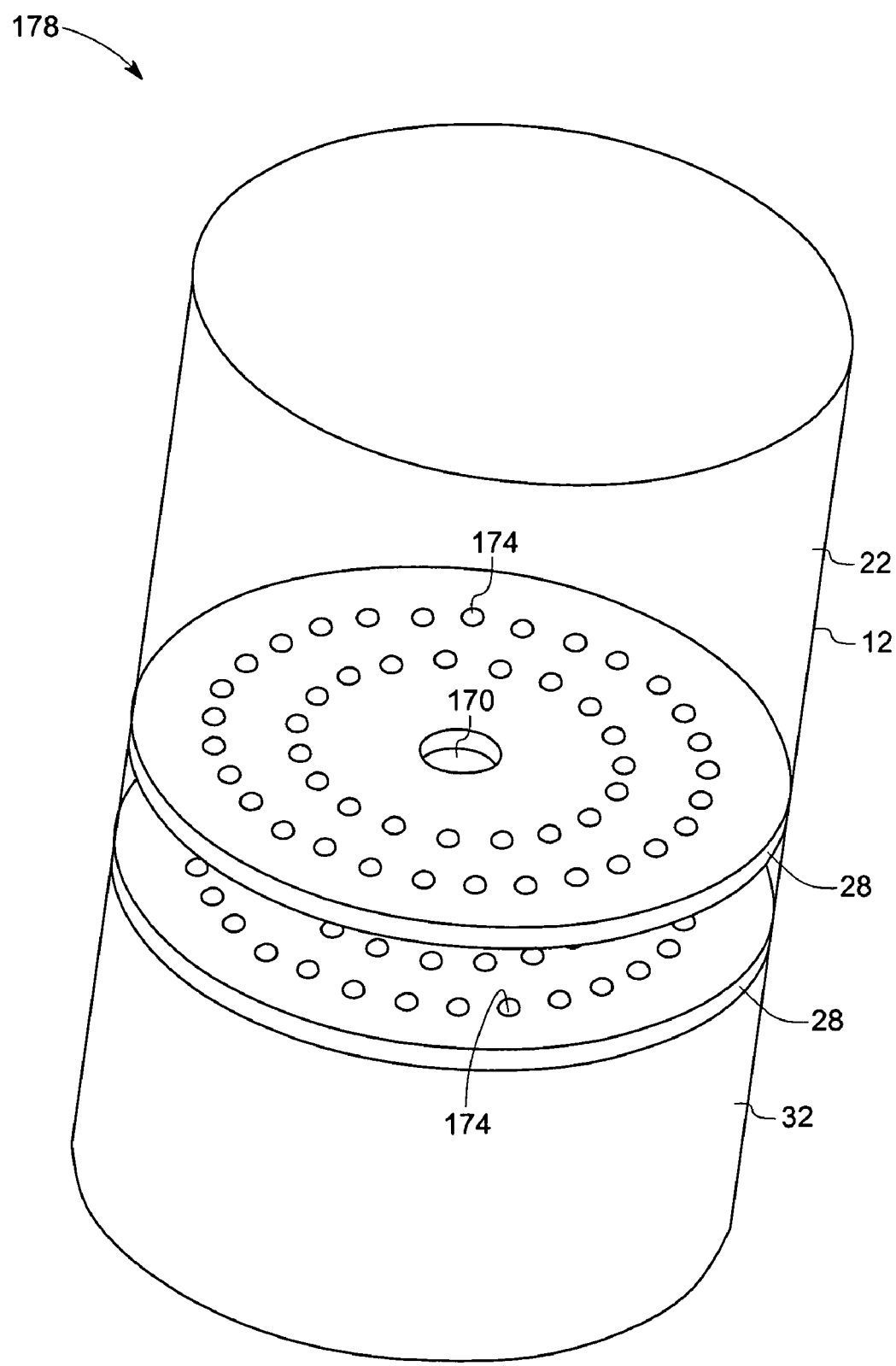
FIG. 11 illustrates an isometric view of multiple baffle plates disposed inside the capsule of FIGS. 1-3 in accordance with embodiments of the present technique.

FIG. 11 illustrates an isometric view of a system 178 having multiple baffle plates 28 disposed inside the capsule 12 of FIGS. 1-3 in accordance with embodiments of the present technique. As illustrated, multiple baffle plates 28 are disposed at offset positions relative to one another inside the capsule 12. The illustrated baffle plates 28 are also aligned such that the openings 170 and 174 are positioned directly over one another. In alternative embodiments, the openings 170 and 174 may have different sizes, shapes, or positions relative to those on the adjacent baffle plate 28. Moreover, the distance between these adjacent baffle plates 28 may be selected to improve the heat distribution and material circulation within the capsule 12 between the chambers 30 and 32.

Figure 12:
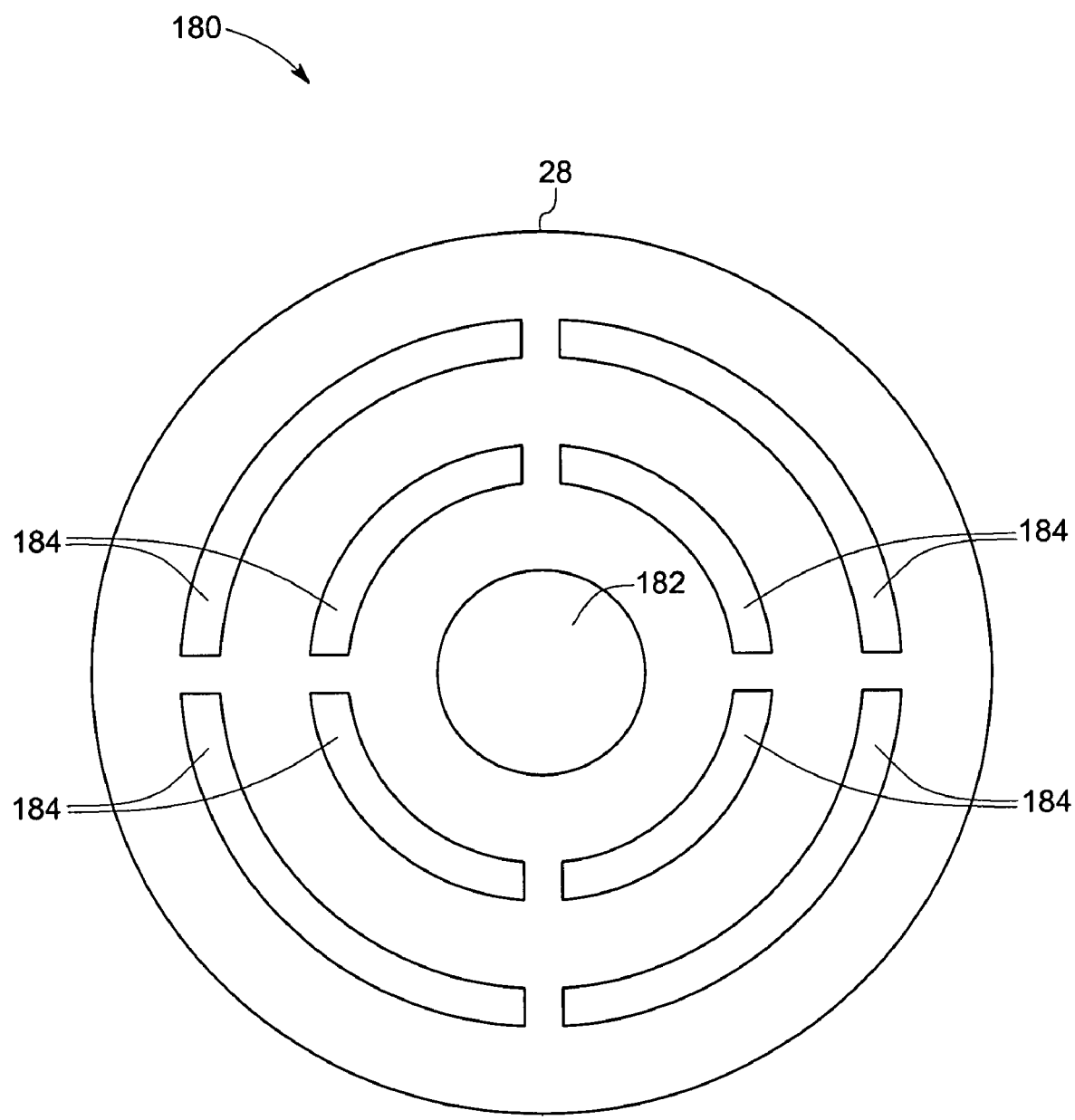
FIG. 12 illustrates a top view of the baffle plate of FIG. 10 having a plurality of concentric rings shaped openings disposed about a central opening in accordance with another exemplary embodiment of the present technique.

FIG. 12 illustrates a top view 180 of the baffle plate 28 of FIG. 10 having a plurality of concentric ring shaped openings 184 disposed about a central opening 182 in accordance with another exemplary embodiment of the present technique. The baffle plate 28 comprises a central opening 182 configured for thermally inducing the circulation of fluid and a plurality of concentric rings shaped opening 184 disposed symmetrically around the central opening 182. The central opening 182 is configured for the downward movement of the supercritical fluid. It should be noted that the central opening 182 does not disrupt the natural convective current and thus maintains uniformity of flow-thermal field in the second chamber 32.

Figure 13:
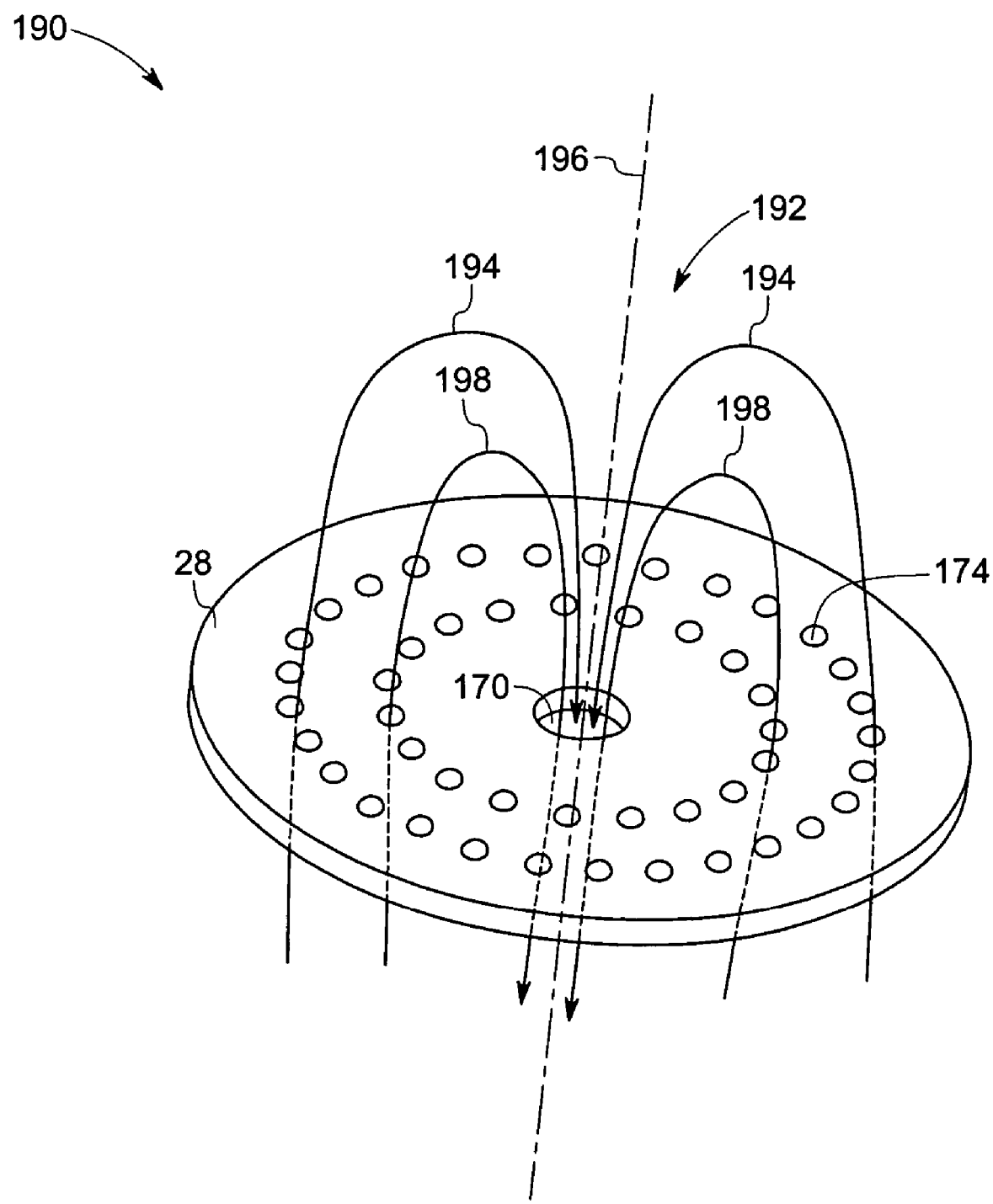
FIG. 13 illustrates a directional flow profile of fluid inside the capsule of FIGS. 1-3 in accordance with embodiments of the present technique.

FIG. 13 is a model 190 of the baffle plate 28 of FIGS. 1-3 and FIGS. 10-12 disposed inside the capsule 12, wherein the model 190 illustrates a directional flow profile 192 of matter flowing through the baffle plate 28 between chambers 30 and 32 in accordance with embodiments of the present technique. As illustrated, the matter flows upwardly from the chamber 32 through the outer openings 174 and into the chamber 30 as indicated by arrows 194 representing an upward flow. This upward flow 194 results from the relatively higher temperatures in the chamber 32. Upon reaching the chamber 30, the matter then turns inwardly toward a longitudinal axis 196 and flows downwardly through the central opening 182 as indicated by arrows 198 representing a downward flow. This downward flow 198 results from the relatively lower temperatures in the chamber 30. This symmetrical arrangement of the plurality of openings 174 around the central opening 170 provides a uniform flow of matter and, also, maintains a uniform temperature differential between the second chamber 32 and the first chamber 30. These conditions provided by the baffle plate 28 substantially optimize the growth of crystals.

During the operation of the capsule 12, the model 190 creates a velocity magnitude profile of matter inside the capsule 12 in accordance with embodiments of the present technique. As will be appreciated by those skilled in the art, the velocity profile of the fluid is uniform through the central opening 170 and also through the plurality of openings 174 of the baffle plate 28. This uniform velocity of the fluid may help in faster and more uniform growth of crystals inside the capsule 12. Similarly, temperature profile of the fluid is also uniform through the openings of the baffle plate 28. This uniform temperature profile of the fluid provides a higher temperature differential between the second chamber 32 and the first chamber 30, while maintaining a more uniform temperature within the second chamber 32 and thus helps in faster and more uniform growth of crystals.

Figure 14:
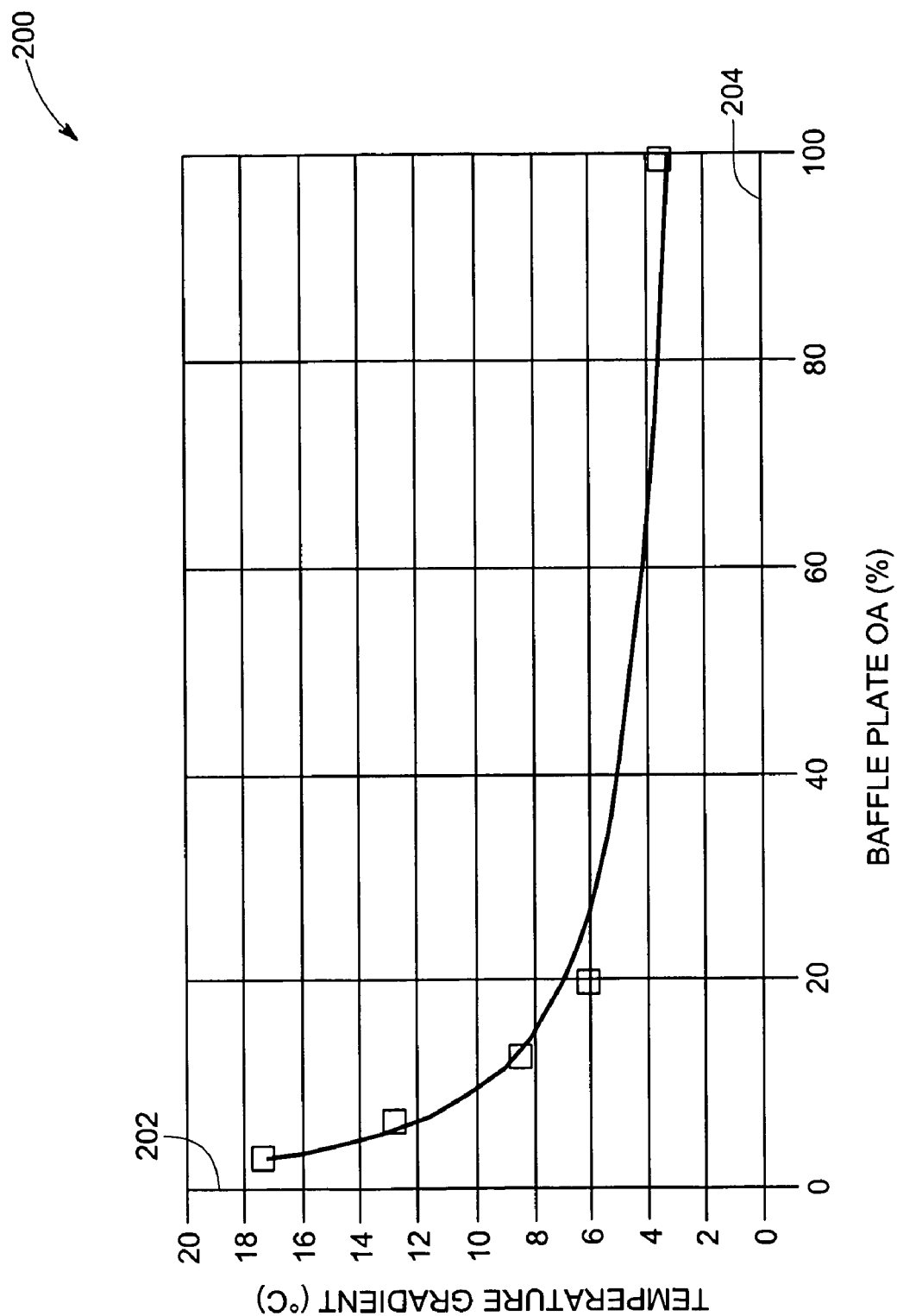
FIG. 14 illustrates a graphical representation of a temperature gradient within the capsule of FIGS. 1-3 versus a percentage of open area of a baffle plate, such as illustrated in FIG. 10, in accordance with embodiments of the present technique.

FIG. 14 is a graphical representation 200 of a temperature gradient 202 within the capsule 12 of FIGS. 1-3 versus a percentage of open area 204 of the baffle plate 28, such as illustrated in FIGS. 10-12, in accordance with embodiments of the present technique. As the percentage open area 204 of the baffle plate 28 increases, for a given external heater power distribution, the temperature gradient 202 decreases. Conversely, as the percentage open area 204 of the baffle plate 28 decreases, the temperature gradient 202 increases. The increase in the temperature gradient inside the capsule represents the uniform growth of the crystals inside the capsule.

The techniques described above with reference to FIGS. 1-14 may be used to grow high quality gallium nitride (GaN) crystals, for example. GaN seed crystals are suspended by a wire through a laser-drilled hole from a silver baffle plate with 5% open area and a central aperture, and are then placed in the lower portion of a silver capsule. Polycrystalline GaN particles, about 3 mm in diameter, are placed above the baffle along with an ammonium fluoride mineralizer. A silver lid with a fill tube is welded to the top of the capsule. The capsule is connected to a gas manifold and evacuated, and then ammonia is condensed into the capsule in order to fill about 85% of the available volume. The weight of mineralizer is about 10% of the weight of ammonia. The capsule is disconnected from the gas manifold and the fill tube is welded closed without exposure to air. The sealed capsule is inserted into the apparatus and heated so that the seed/crystal chamber reaches a temperature of about 700 degrees Celsius and the nutrient chamber reaches a temperature of about 680 degrees Celsius. The capsule is maintained at these temperatures for a period of 5 to 2000 hours and then cooled. The capsule is punctured to allow for removal of the ammonia and then cut open to remove the gallium nitride crystals. After washing in dilute hydrochloric acid, high quality gallium nitride crystals are recovered. The crystals typically have an infrared absorption peak near 3175 $cm^{-1}$ with an absorbance per unit thickness between about 0.01 and 200 $cm^{-1}$ and have a dislocation density below about $10^4$ $cm^{-2}$.

While only certain features of the invention have been illustrated and. Described herein, many modifications and changes will occur to those skilled in the art. It is, therefore, to be understood that the appended claims are intended to cover all such modifications and changes as fall within the true spirit of the invention.

The invention claimed is:

1. An apparatus comprising:
a capsule configured to contain a supercritical fluid;
a pressure vessel disposed about the capsule, wherein the pressure vessel is configured to contain a pressurized gas surrounding the capsule;
a pressure control device configured to balance an interior pressure within the capsule with a surrounding pressure of the pressurized gas within the pressure vessel in response to sensed environmental conditions within the capsule and the pressure vessel; and
a displacement measuring device configured to measure deformation of the capsule due to a pressure difference between the interior pressure and the surrounding pressure.

2. The apparatus of claim 1, comprising a pressure sensor disposed inside the capsule, wherein the pressure sensor is configured to measure the interior pressure.

3. The apparatus of claim 1, comprising at least one perforated baffle plate disposed within the capsule dividing the capsule into a first chamber and a second chamber, wherein the at least one perforated baffle plate comprises a central opening and a plurality of openings disposed symmetrically around the central opening.

4. The apparatus of claim 1, comprising temperature and pressure sensors disposed inside the capsule and/or between the pressure vessel and the capsule, wherein the temperature and pressure sensors are configured to enable feedback based control of environmental conditions within the capsule and to enable feedback based control to balance the interior and surrounding pressures of the capsule.

5. The apparatus of claim 1, wherein the capsule is deformable, chemically inert, and substantially impermeable to the supercritical fluid.

6. The apparatus of claim 1, comprising a gallium nitride crystal having an infrared absorption peak near 3175 cm$^{-1}$ with an absorbance per unit thickness between about 0.01 and 200 cm$^{-1}$ and wherein the gallium nitride crystal is grown in supercritical ammonia at a temperature above 550 degrees Celsius.

7. An apparatus comprising:
a high strength enclosure disposed about a plurality of high strength wedge shaped radial segments;
a capsule disposed inside the high strength enclosure, wherein the capsule is configured to contain one or more materials in an environment having a supercritical fluid;
a heating device disposed between the high strength enclosure and the capsule, wherein the heating device is configured to transfer heat into the environment within the capsule, such that the environment becomes heated and self-pressurized from the heat, wherein the high strength enclosure is configured to surround and bear against the capsule to counterbalance internal pressures within the capsule; and
thermal insulation disposed between the high strength enclosure and the heating device, wherein the thermal insulation is configured to retain heat within the capsule and to reduce heat transfer into the high strength enclosure.

8. The apparatus of claim 7, comprising a cooling device configured to cool the high strength enclosure.

9. The apparatus of claim 7, wherein the apparatus is configured to increase the operating conditions within the capsule to pressures exceeding 1 kbar and temperatures exceeding 550 degrees Celsius or to pressures exceeding 5 kbar and temperatures exceeding 300 degrees Celsius.

10. The apparatus of claim 7, wherein the capsule is mechanically expandable and contractible, chemically inert, and impermeable to the supercritical fluid.

11. The apparatus of claim 7, comprising a temperature control system configured to control the heating device for controlling the temperature of the capsule.

12. The apparatus of claim 7, comprising a dividing structure disposed within the capsule dividing the capsule into a first chamber and a second chamber, wherein the dividing structure comprises a central opening and a plurality of openings disposed symmetrically around the central opening.

13. The apparatus of claim 7, comprising a high temperature liner disposed between the thermal insulation and the high strength enclosure.

14. The apparatus of claim 7, wherein the plurality of high strength wedge-shaped radial segments are disposed one after another around a circumference of the capsule inside the high strength enclosure.

15. The apparatus of claim 7, wherein the capsule comprises a sleeve having a larger thermal expansion coefficient than the heating element.

16. The apparatus of claim 7, comprising a gallium nitride crystal having an infrared absorption peak near 3175 cm$^{-1}$ with an absorbance per unit thickness between about 0.01 and 200 cm$^{-1}$ and wherein the gallium nitride crystal is grown in supercritical ammonia at a temperature above 550 degrees Celsius.

17. An apparatus comprising:
a pressure vessel configured to process material contained in a self pressurizing capsule, wherein the pressure vessel is configured to contain a pressurized gas surrounding the self-pressurizing capsule;
a displacement measuring device configured to measure deformation of the self pressurizing capsule due to a pressure difference between an interior pressure and a surrounding pressure of the self-pressurizing capsule; and
a pressure control device configured to balance the interior pressure within the capsule with the surrounding pressure of the pressurized gas within the pressure vessel by minimizing displacement or deformation of the self-pressurizing capsule.

18. An apparatus comprising:
a high strength enclosure disposed about a plurality of high strength wedge shaped radial segments;
a heating device disposed inside the high strength enclosure and configured to receive a capsule, wherein the heating device is configured to transfer heat into the environment within the capsule, such that the environment becomes heated and self pressurized from the heat, wherein the high strength enclosure is configured to surround and bear against the capsule to counterbalance internal pressures within the capsule without significant gas pressure between the heating device and the capsule; and
thermal insulation disposed between the high strength enclosure and the heating device.

19. A method of manufacturing an apparatus comprising:
providing a high strength enclosure disposed about a plurality of high strength wedge-shaped radial segments;
providing a capsule configured to be positioned inside the high strength enclosure, wherein the capsule is configured to contain a substance including a supercritical fluid, providing a heating device configured to be positioned between the high strength enclosure and the capsule; and
providing thermal insulation configured to be positioned between the high strength enclosure and the heating device.

20. An apparatus comprising:
a capsule configured to contain a supercritical fluid;
a pressure vessel disposed about the capsule, wherein the pressure vessel is configured to contain a pressurized gas surrounding the capsule;
a pressure control device configured to balance an interior pressure within the capsule with a surrounding pressure of the pressurized gas within the pressure vessel in response to sensed environmental conditions within the capsule or the pressure vessel; and
a displacement measuring device configured to measure deformation of the capsule due to a pressure difference between the interior pressure and the surrounding pressure.

21. The apparatus of claim 20, comprising a pressure sensor disposed inside the capsule, wherein the pressure sensor is configured to measure the interior pressure.

22. The apparatus of claim 20, comprising at least one perforated baffle plate disposed within the capsule dividing the capsule into a first chamber and a second chamber, wherein the at least one perforated baffle plate comprises a central opening and a plurality of openings disposed symmetrically around the central opening.

23. The apparatus of claim 20, comprising temperature and pressure sensors disposed inside the capsule and/or between the pressure vessel and the capsule, wherein the temperature and pressure sensors are configured to enable feedback-based control of environmental conditions within the capsule and to enable feedback-based control to balance the interior and surrounding pressures of the capsule.

24. The apparatus of claim 20, wherein the capsule is deformable, chemically inert, and substantially impermeable to the supercritical fluid.

25. The apparatus of claim 20, comprising a gallium nitride crystal having an infrared absorption peak near 3175 cm$^{-1}$ with an absorbance per unit thickness between about 0.01 and 200 cm$^{-1}$ and wherein the gallium nitride crystal is grown in supercritical ammonia at a temperature above 550 degrees Celsius.

26. An apparatus comprising:

a capsule configured to contain a supercritical fluid;

a pressure vessel disposed about the capsule, wherein the pressure vessel is configured to contain a pressurized gas surrounding the capsule;

a gas pressure intensifier device and a pressure control device both of said devices being configured to balance an interior pressure within the capsule with a surrounding pressure of the pressurized gas within the pressure vessel in response to sensed environmental conditions within the capsule and the pressure vessel; and a displacement measuring device configured to measure deformation of the capsule due to a pressure difference between the interior pressure and the surrounding pressure.

27. The apparatus of claim 26, comprising a pressure sensor disposed inside the capsule, wherein the pressure sensor is configured to measure the interior pressure.

28. The apparatus of claim 26, comprising at least one perforated baffle plate disposed within the capsule dividing the capsule into a first chamber and a second chamber, wherein the at least one perforated baffle plate comprises a central opening and a plurality of openings disposed symmetrically around the central opening.

29. The apparatus of claim 26, comprising temperature and pressure sensors disposed inside the capsule and/or between the pressure vessel and the capsule, wherein the temperature and pressure sensors are configured to enable feedback-based control of environmental conditions within the capsule and to enable feedback-based control to balance the interior and surrounding pressures of the capsule.

30. The apparatus of claim 26, wherein the capsule is deformable, chemically inert, and substantially impermeable to the supercritical fluid.

31. The apparatus of claim 26, comprising a gallium nitride crystal having an infrared absorption peak near 3175 cm$^{-1}$ with an absorbance per unit thickness between about 0.01 and 200 cm$^{-1}$ and wherein the gallium nitride crystal is grown in supercritical ammonia at a temperature above 550 degrees Celsius.

* * * * *